(12) United States Patent
Bourassa et al.

(10) Patent No.: US 11,341,428 B2
(45) Date of Patent: May 24, 2022

(54) SCALABLE PHOTONIC QUANTUM COMPUTING WITH HYBRID RESOURCE STATES

(71) Applicant: Xanadu Quantum Technologies Inc., Toronto (CA)

(72) Inventors: Joseph Eli Bourassa, Toronto (CA); Ilan Tzitrin, Vaughan (CA); Krishnakumar Sabapathy, Lisle (CA); Guillaume Dauphinais, North York (CA); Ish Dhand, Toronto (CA); Saikat Guha, Tucson, AZ (US); Nicolas Menicucci, Hawthorn (AU); Rafael Alexander, Albuquerque, NM (US); Ben Baragiola, Albuquerque, NM (US); Takaya Matsuura, Tokyo (JP); Blayney Walshe, Geelong (AU)

(73) Assignee: Xanadu Quantum Technologies Inc., Toronto (CA)

( * ) Notice: Subject to any disclaimer, the term of this patent is extended or adjusted under 35 U.S.C. 154(b) by 0 days.

(21) Appl. No.: 17/488,633

(22) Filed: Sep. 29, 2021

(65) Prior Publication Data

US 2022/0101168 A1    Mar. 31, 2022

Related U.S. Application Data

(60) Provisional application No. 63/084,994, filed on Sep. 29, 2020.

(51) Int. Cl.
*G06N 10/00*    (2022.01)
*G06E 1/00*    (2006.01)

(52) U.S. Cl.
CPC .............. *G06N 10/00* (2019.01); *G06E 1/00* (2013.01)

(58) Field of Classification Search
CPC ................................. G06N 10/00; G06E 1/00
See application file for complete search history.

(56) References Cited

U.S. PATENT DOCUMENTS

2020/0401927 A1* 12/2020 Nickerson ............. H03M 13/29
2021/0304053 A1*  9/2021 Pant .................... G06F 11/1004

FOREIGN PATENT DOCUMENTS

WO    WO 2019/178009 A1    9/2019

OTHER PUBLICATIONS

Daiqin Su, Krishna Kumar Sabapathy, Casey R. Myers, Haoyu Qi, Christian Weedbrook, and Kamil Bradler, "Implementing quantum algorithms on temporal photonic cluster states", Physical Review A 98, Mar. 23, 2016 (2018) (Year: 2018).*

(Continued)

*Primary Examiner* — Ajay Ojha
(74) *Attorney, Agent, or Firm* — Cooley LLP

(57) ABSTRACT

A system for scalable, fault-tolerant photonic quantum computing includes multiple optical circuits, multiple photon number resolving detectors (PNRs), a multiplexer, and an integrated circuit (IC). During operation, the optical circuits generate output states via Gaussian Boson sampling (GBS), and the PNRs generate qubit clusters based on the output states. The multiplexer multiplexes the qubit clusters and replaces empty modes with squeezed vacuum states, to generate multiple hybrid resource states. The IC stitches together the hybrid resource states into a higher-dimensional cluster state that includes states for fault-tolerant quantum computation.

16 Claims, 27 Drawing Sheets

(56) References Cited

OTHER PUBLICATIONS

International Search Report and Written Opinion dated Nov. 19, 2021 for International Application No. PCT/CA2021/051358, 11 pages.
Bourassa, J. E. et al., "Blueprint for a Scalable Photonic Fault-Tolerant Quantum Computer," Quantum, 5:392 (2021), 38 pages; arXiv:2010.02905v2.
Gottesman, D. et al., "Encoding a qubit in an oscillator," Phys. Rev. A., 64:012310 (2001), 21 pages; doi:10.1103/PhysRevA.64.012310.
Su, D. et al., "Conversion of Gaussian states to non-Gaussian states using photon number-resolving detectors," Phys. Rev. A., 100:052301 (2019), 37 pages; arXiv: 1902.02323v2.
Su, D. et al., "Implementing quantum algorithms on temporal photonic cluster states," Phys. Rev. A., 98:032316 (2018), 22 pages; arXiv: 1805.02645v1.
Tzitrin, I. et al., "Fault-tolerant quantum computation with static linear optics," Phys. Rev. X Quantum, 2:040353 (2021), 15 pages; arXiv:2104.03241v2.
Walshe et al., "Continuous-variable gate teleportation and bosonic-code error correction," Phys. Rev. A., 102:062411 (2020), 21 pages; arXiv:2008.12791v3.
U.S. Appl. No. 16/997,601, filed Aug. 19, 2020.

* cited by examiner

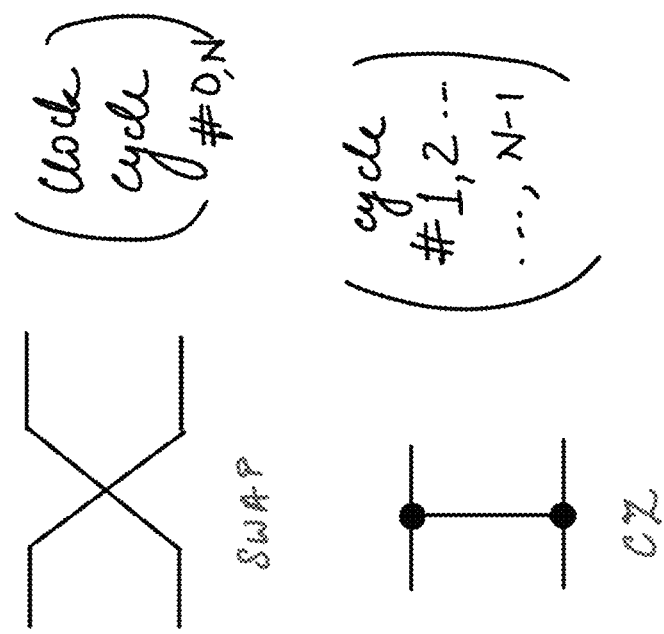
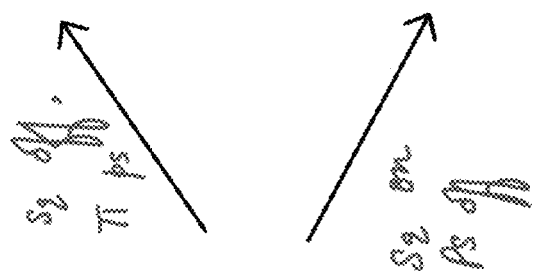
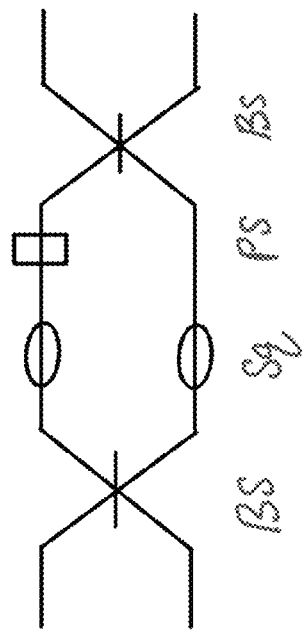
FIG. 3B

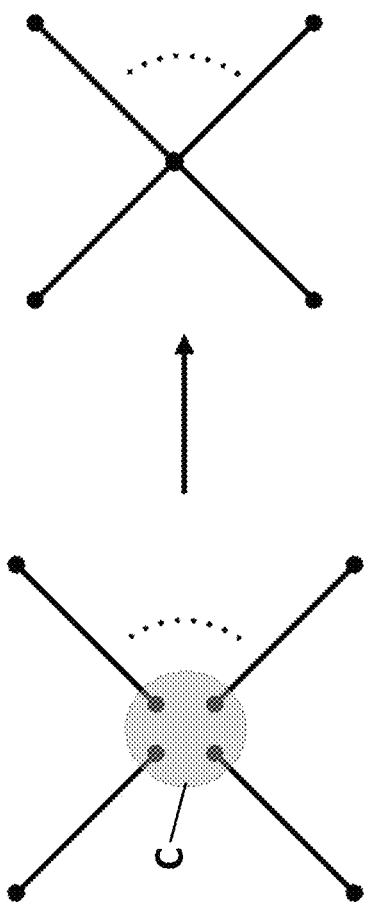

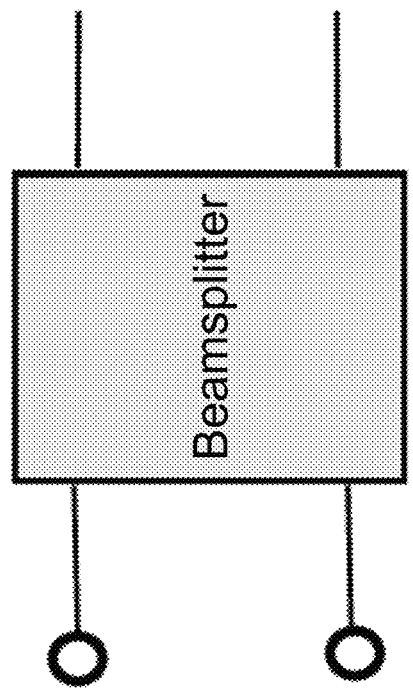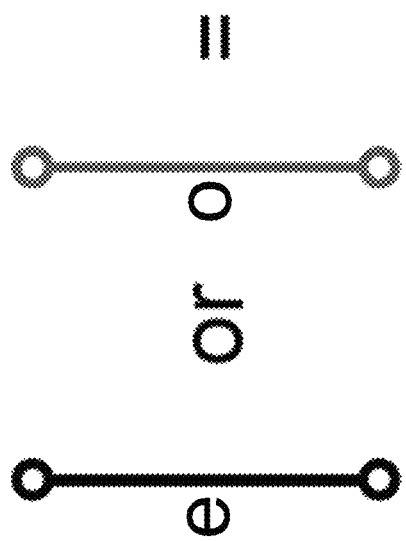
FIG. 10A

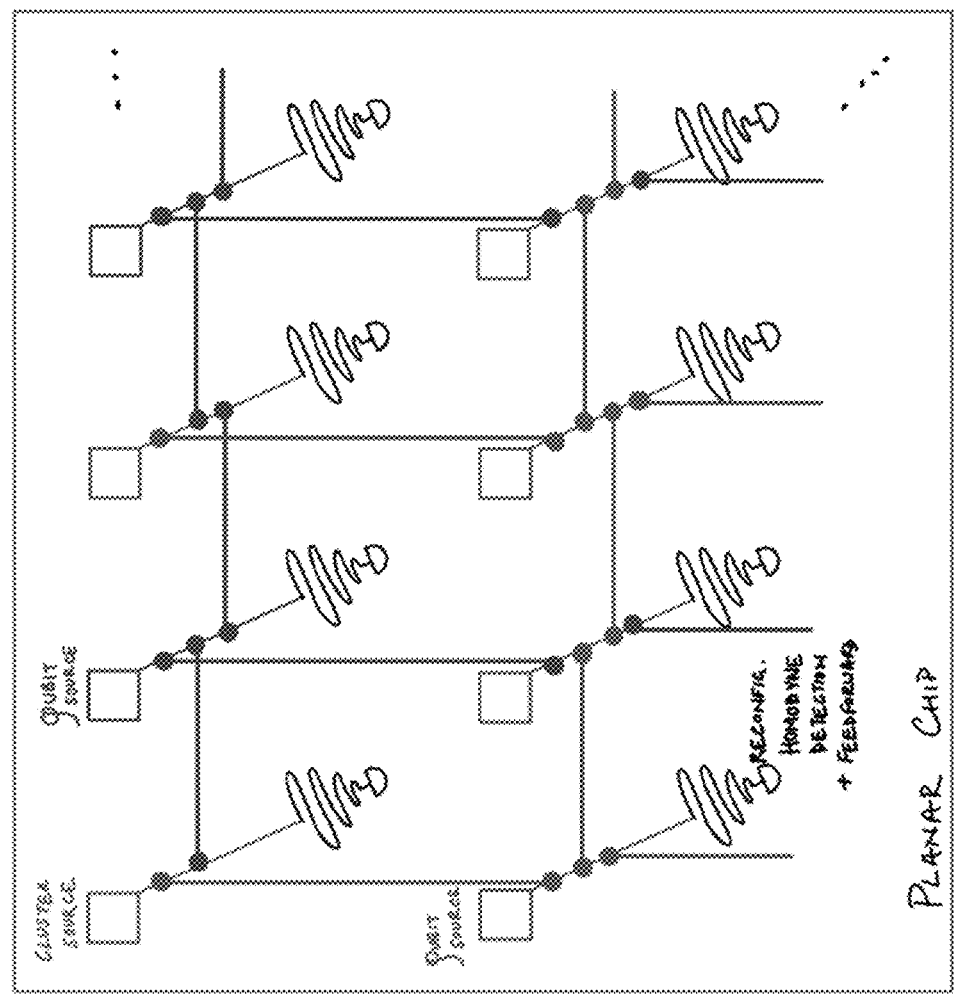
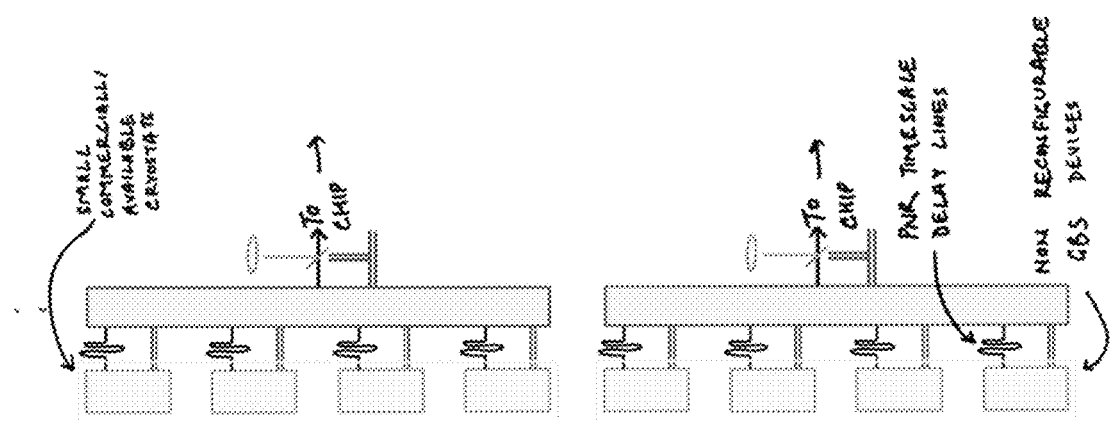
FIG. 17

SCALABLE PHOTONIC QUANTUM COMPUTING WITH HYBRID RESOURCE STATES

CROSS-REFERENCE TO RELATED APPLICATIONS

This application claims priority to and benefit of U.S. Provisional Patent Application No. 63/084,994, filed Sep. 29, 2020 and titled "Scalable Photonic Quantum Computing with Hybrid Resource States," the entire content of which is incorporated herein by reference in its entirety.

FIELD

The present disclosure relates generally to the field of photonic quantum computing, and more specifically, to the generation of three-dimensional resource states such as bosonic qubits and squeezed states.

BACKGROUND

The ability to store and coherently manipulate quantum optical pulses is desirable for the development of long-distance quantum communications and quantum computing. Integrating these functions into a photonic chip with other quantum technologies, such as sources of entangled photons, is an important practical step towards implementing such applications.

SUMMARY

One or more embodiments described herein relate to the generation of three-dimensional resource states including bosonic qubits and squeezed states. In some embodiments, a system for scalable, fault-tolerant photonic quantum computing includes multiple optical circuits, multiple photon number resolving detectors (PNRs), a multiplexer, and an integrated circuit (IC). During operation, the optical circuits generate output states via Gaussian Boson sampling (GBS), and the PNRs generate qubit clusters based on the output states. The multiplexer multiplexes the qubit clusters and replaces empty modes with squeezed vacuum states, to generate multiple hybrid resource states. The IC transforms the hybrid resource states (e.g., by stitching together the hybrid resource states) into a higher-dimensional cluster state that includes states appropriate for fault-tolerant quantum computation.

BRIEF DESCRIPTION OF THE DRAWINGS

The drawings primarily are for illustration purposes and are not intended to limit the scope of the subject matter described herein. The drawings are not necessarily to scale; in some instances, various aspects of the disclosed subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A-3B are diagrams showing the generation of a 1D qubit cluster in the time domain, according to an embodiment.

FIG. 9 shows an example graph transformation for passive construction of general graph states, according to an embodiment.

FIGS. 10A-10B show equivalent circuits for states depicted in FIG. 8, according to an embodiment.

FIG. 17 illustrates the modularity of the system configuration of GBS generating chips, in accordance with some embodiments.

DETAILED DESCRIPTION

Figure 1:
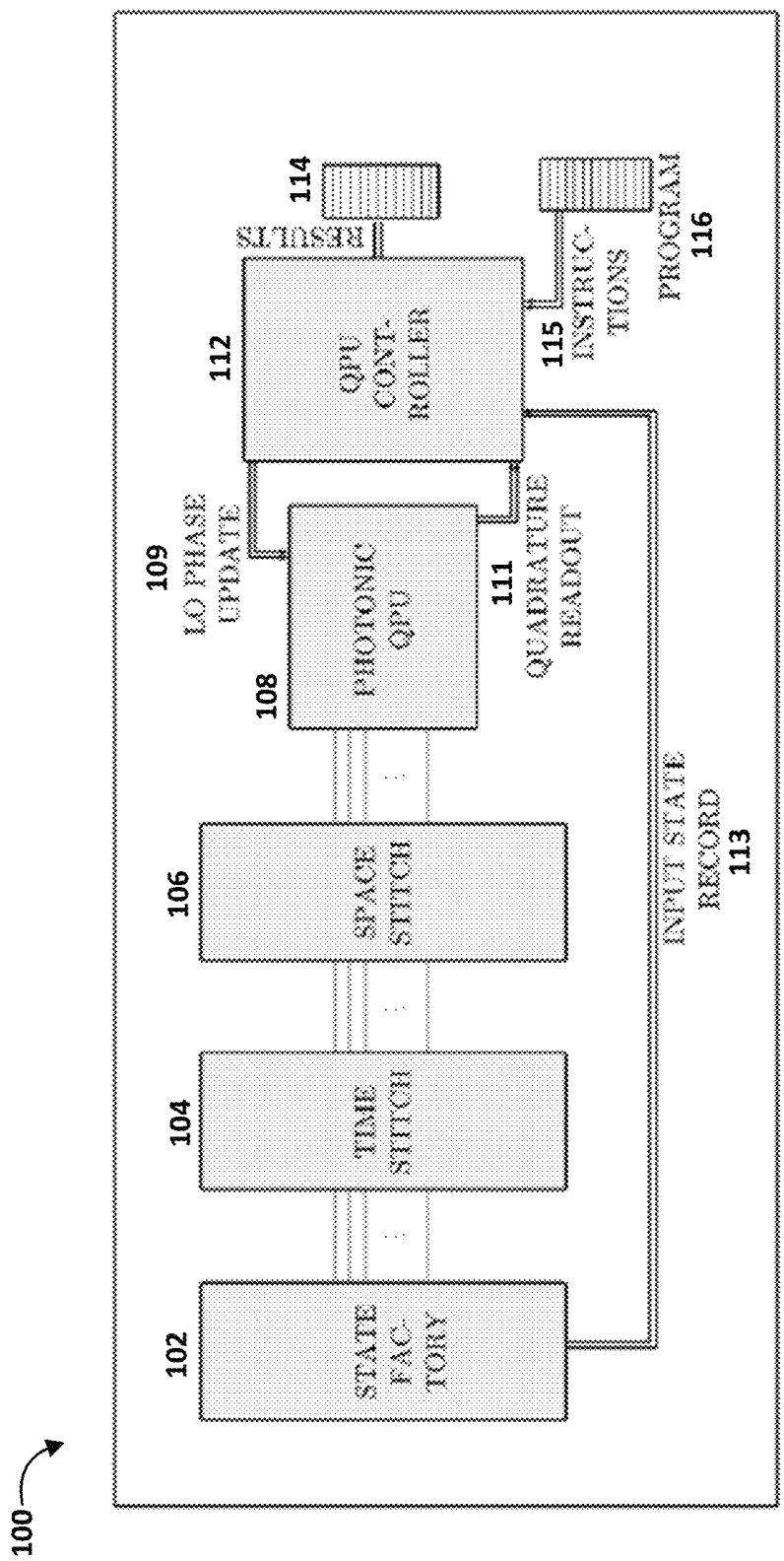
FIG. 1 is a system diagram showing a system for generating a hybrid cluster state, according to an embodiment.

Fault-tolerant photonic quantum computing is an active area of research, however, known systems have proven impractical to implement due to cost, size, and/or complexity. For example, some known quantum computing systems perform near-deterministic generation of non-Gaussian states, but in so doing incur very high experimental costs, and an impractical number of devices would be needed to achieve a desirable level of reliability. Other known quantum computing systems perform direct generation of encoded qubit clusters, but are difficult to multiplex and costly to implement.

Embodiments set forth herein include a system configuration for photonic quantum computing that overcome the challenges of known systems discussed above by generating and manipulating three-dimensional resource states that include both bosonic qubits and squeezed vacuum states. In some embodiments, known methods of non-deterministic generation of bosonic qubits are leveraged while simultaneously providing the advantage of continuous-variable quantum computing, for example via the implementation of Clifford gates using squeezed states. Some system configurations set forth herein are implemented using a two-dimensional circuit of an integrated photonic chip that generates a qubit cluster state in one temporal dimension and two spatial dimensions. The two-dimensional circuit facilitates a modular approach to quantum computing, in that different photonic chips can be optimized for different aspects of a desired computing protocol. In some such implementations, a primary computational chip can be used for operation at ambient conditions, such that scalable fabrication and operation of the quantum computer can be achieved.

INTRODUCTION

On the path to building a scalable fault-tolerant quantum computer, photonics promises advantages as compared with competing platforms. These advantages may include: (i) the possibility of room-temperature computation, which allows scaling up to large numbers of qubits by adopting (with minimal modification) known silicon electronics and photonics technologies, (ii) intrinsic compatibility with communication technologies, such that high-fidelity connections can be made between multiple modules (i.e., multiple quantum computing circuits, whether photonic or otherwise) without the noisy transduction steps of other platforms, and (iii) inherent flexibility in choosing error-correction codes, including high-dimension codes using the temporal degree of freedom, on the path to fault-tolerance. These advantages motivate the serious consideration of photonic quantum computation system configurations.

Known photonic quantum computing system configurations can be viewed as including two main classes. The first class of system configurations is based on using continuous variable (CV) cluster states along with encoded qubits, and exploits the relative ease of generation of CV cluster states from squeezed light (as compared with known technologies). In such system configurations, quantum information is encoded in bosonic qubits, for example bosonic qubits of the type introduced by Gottesman, Kitaev and Preskill (hereinafter "GKP" qubits) while Clifford operations and non-Clifford operations are implemented using CV clusters and non-Gaussian resources, respectively. Additional details about GKP encoding can be found in "Encoding a Qubit in an Oscillator" by D. Gottesman, et al., *Physical Review Letters A* (64), 012310 (2001), the disclosure of which is incorporated herein by reference in its entirety. This class also encompasses the design and generation of CV cluster states in different lattices such as the bilayer square lattice (BSL), double BSL and modified BSL. Known implementations of system configurations within the first class often rely on near-deterministic generation of non-Gaussian states for encoding information, for acting as non-Clifford gates, and for correcting CV errors. This reliance on near-deterministic generation of non-Gaussian states can lead to prohibitively high experimental costs. Multiplexing a non-deterministic state generation procedure to generate states with near-unity probability 1−p implies that the number of state generation devices scales as 1/p, which is prohibitively large as p→0.

The second class of system configurations is based on directly generating a cluster of encoded qubits. This class includes schemes developed for dual-rail encodings, cat-basis encoding, and GKP encoding. These schemes differ from those in the first class in that they are well-suited for non-deterministic state generation of encoded qubits and the non-deterministic gates used to build a cluster state. A challenge with these schemes, however, is that each gate is eventually implemented by consuming encoded qubits, which pose formidable multiplexing requirements because of their non-deterministic nature and thus consume significantly more experimental resources than would nodes of a deterministically generated CV cluster state.

In view of the foregoing, it is desirable to devise a hybrid scheme that leverages the advantages of both classes of photonic quantum computing system configuration, for example by both implementing Clifford operations using CV resources while still being compatible with non-deterministic generation of encoded qubits. One or more embodiments set forth herein present precisely such a scheme.

In addition to the advantages described above, photonic quantum computing system configurations of the present disclosure exhibit several features that are desirable for scalability. One such desirable feature is that the system configurations can be suitable for fully on-chip implementation, as contrasted with known systems for CV photonic quantum computation, which are typically optimized for free-space implementations. Fully on-chip implementation is facilitated by the planar nature of one or more photonic quantum computing system configurations of the present disclosure, for example in which each qubit is connected to a small and constant number of neighboring qubits, such that there is a constant number of intersecting channels per qubit. Another desirable feature is that the system configuration is modular, with the size and number of the integrated photonic chips being independent of the depth of the desired circuit. In addition, one or more of the individual modules of the present disclosure can be specialized to ensure compatibility with other technologies, as contrasted with known photonic quantum computing system configurations (e.g., system configurations for dual-rail qubits), which involve the combination of seemingly incompatible technologies. As an example, consider the challenge of achieving low-loss and fast reconfigurable optical switching in cryogenic conditions. According to one or more embodiments of the photonic quantum computing system configuration, the state-generation modules can be low loss, but not reconfigurable; the multiplexing modules can pose less severe loss constraints and, thus, can be made re-configurable; and the computational modules can accommodate relatively lossy (e.g., between 0.1 dB and 10 dB of loss) reconfigurable switches at room temperature. Moreover, the computational module permits operation at ambient temperature and pressure, such that manufacturing scalability can be achieved (e.g., via complementary metal-oxide-semiconductor (CMOS) processes).

From the theoretical perspective, one or more embodiments of the present disclosure encompass at least two novel features. First, a planar system configuration for measurement-based quantum computing in the Raussendorf model using CV encoded qubits is described (see the "Modular System Configuration" section, below). Second, a method for fault-tolerant quantum computing with a hybrid resource state is described, in which some of the sites (i.e., the light pulses at given locations of the quantum system chip, at a given time) are bosonic qubits while others are squeezed vacuum. Such a resource can be generated using relatively modest experimental resources. The "Quantum Error Correction" section, below, details an example model for fault-tolerant quantum computation, and the associated technological advantages are discussed in the "Technological Advantages" section that follows.

Overview of the System Configuration

In some embodiments, a photonic quantum computing system configuration includes three modules that are collectively configured to generate computational resource states in two spatial dimensions and in one temporal dimension, using a two-dimensional circuit of an integrated photonic chip. Each resource state includes one or more clusters of encoded qubits (e.g., GKP qubits), magic states, and CV nodes that are stitched together into a hybrid "cluster state." As used herein, "stitching" refers to the creation/imposition of entanglement between the different states. For example, during operation of the two-dimensional circuit, non-deterministically generated encoded qubits and magic states can be stitched into a random but known subset of the sites (by virtue of their being generated at some random subset of locations, while not being generated at other locations), while the remaining sites are populated with deterministically generated squeezed vacuum states. An indication of whether or not a location is within the subset of the sites is stored in the multiplexer. The encoded qubits carry the quantum information and are used for CV error correction. The magic states are used to implement non-Clifford operations as desired, and Clifford operations are performed using the CV nodes of the cluster state if nearby CV nodes are available. As used herein, "magic states" refer to states that facilitate universal quantum computation when used together with operations from the Clifford group, whose elements effect permutations of the Pauli operators. For example, the eigenstates of the π/4 gate are magic states.

In some embodiments, the generation of the hybrid cluster state is performed using three modules: a state preparation module, a multiplexing module, and a main computational module. The state preparation module is configured (e.g., programmed or hard-wired) to generate bosonic qubits and magic states. The multiplexing module is configured (e.g., programmed or hard-wired) to perform multiplexing of the bosonic qubits to boost qubit generation rates and replace empty modes (e.g., in which multiplexed qubit-generation failed) with squeezed vacuum states. "Multiplexing," as used herein, refers to the use of multiple non-deterministic qubit-generation devices in parallel, and the routing of a qubit generated in any of these devices to the output. The probability of at least one qubit-generation device from the multiple qubit-generation devices succeeding is higher (i.e., "boosted") as compared with the probability of a single (non-multiplexed) device succeeding. The main computational module is configured (e.g., programmed or hard-wired) to stitch together (or "entangle") the hybrid resource state for universal fault-tolerant quantum computation, and to perform reconfigurable measurements on the generated resource state to complete the computation. These steps are described in greater detail below.

As shown in FIG. 1, an example system 100 for generating a hybrid cluster state, according to an embodiment, includes a state factory 102, a time stitch 104, a space stitch 106, a photonic quantum processing unit (QPU) 108, and a QPU controller 112. Each of the state factory 102, the time stitch 104, the space stitch 106, the photonic QPU 108, and the QPU controller 112 represents logical functionality that can be implemented using hardware, software, or a combination thereof. As used herein, "active" system implementations (e.g., of system 100) refer to implementations that include inline squeezers/perform inline squeezing, and thus that use additional squeezed states and homodyne measurements, whereas "passive" system implementations (e.g., of system 100) refer to implementations that do not include inline squeezers/do not perform inline squeezing and/or that perform stitching with beamsplitters.

The state factory 102 is operably coupled to the time stitch 104, which in turn is operably coupled to the space stitch 106, which in turn is operably coupled to the photonic QPU 108. The state factory 102 component generates GKP states and outputs the GKP states to the time stitch 104, which implements delay line loops and chains qubits together as they are received. The space stitch 106 component multiplexes outputs from the time stitch 104, in the spatial domain, to produce multi-dimensional hybrid resource states. The photonic QPU 108, in turn, is controlled by the QPU controller 112 to entangle the hybrid resource states from the plurality of hybrid resource states into a higher-dimensional cluster state that includes states for fault-tolerant quantum computation, as discussed herein. The QPU controller 112 can receive quadrature readouts 111 from the photonic QPU 108, and can send lo phase updates 109 to the photonic QPU 108. The QPU controller 112 can also receive instructions 115 associated with a program 116, and can output results 114.

Modular System Configuration

Figure 2A:
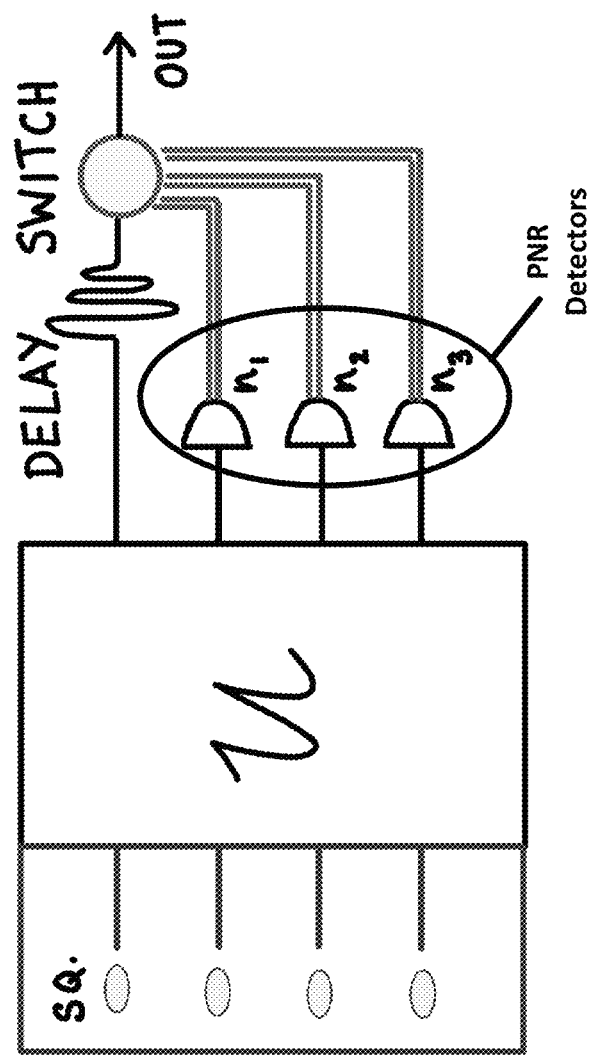
FIG. 2A is a diagram showing an integrated photonic device implementing Gaussian Boson sampling ("GBS") based preparation of non-Gaussian states.
Figure 2B:
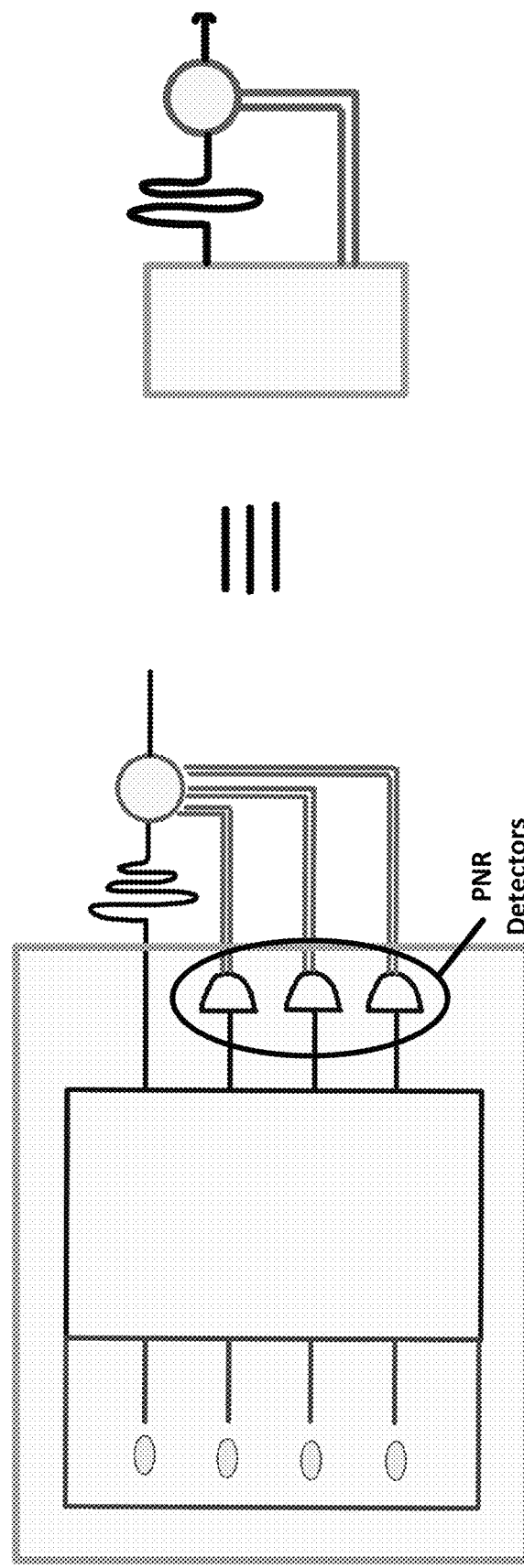
FIG. 2B is a diagram showing a simplified representation of a single GBS device.
Figure 2C:
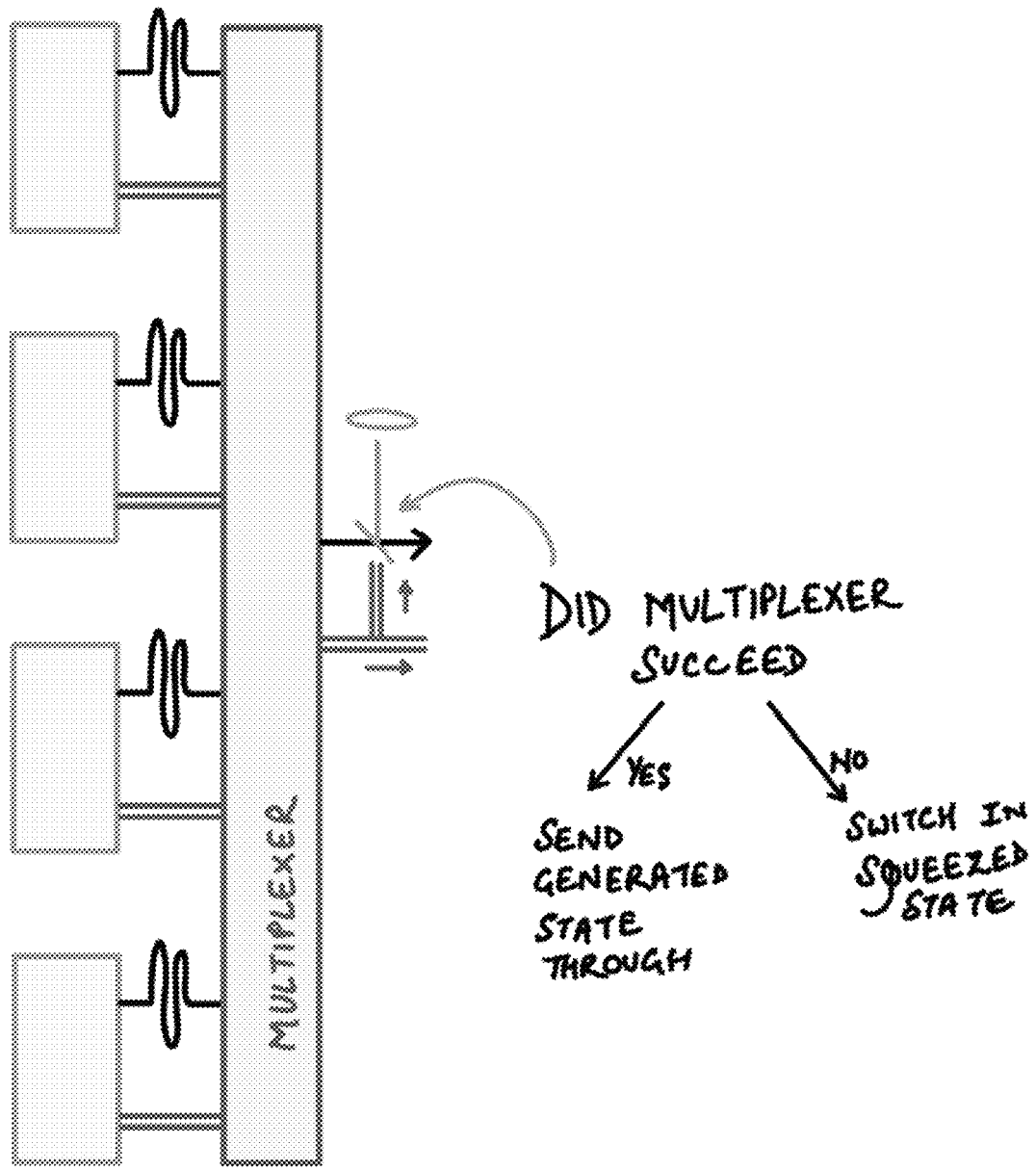
FIG. 2C is a diagram showing a state preparation device including GBS devices that are multiplexed in the spatial domain and/or the temporal domain, according to an embodiment.

Generation of Bosonic Qubits Using Multiplexed Gaussian Boson Sampling ("GBS") Devices The generation of non-Gaussian states of light, including states of single bosonic qubits, has been proposed, analyzed and developed by researchers. Although high-fidelity state generation from a single GBS device is non-deterministic, GBS devices can be multiplexed to obtain high rates and fidelities of state generation, and increasing amounts of hardware resources can be used to increase the rates and fidelities of the generated states. The multiplexing of GBS devices can be used to exploit the non-Gaussian resource of photon number resolving detectors (PNRs) and can generate arbitrary logical single-qubit states for bosonic encodings such as those of the GKP and cat basis. FIGS. 2A-2C depict an example of such multiplexed state generation.

FIG. 2A is a diagram showing a single integrated photonic device implementing Gaussian Boson sampling ("GBS") based preparation of non-Gaussian states. In FIG. 2A, light emitted from one output port is in a chosen non-Gaussian state subject to obtaining the correct click pattern $\{n_i\}$ at the PNR detectors (the "D"-shaped objects in FIGS. 2A-2B) connected to the remaining output ports. The double lines represent classical (i.e., non-quantum) logic, which is used to trigger a switch on the emitted port. FIG. 2B is a diagram showing a simplified representation of a single GBS device, and FIG. 2C is a diagram showing a state preparation device including GBS devices that are multiplexed in the spatial domain and/or the temporal domain, using the classical logic, according to an embodiment.

Time Domain Generation of 1D Clusters

Figure 3A:
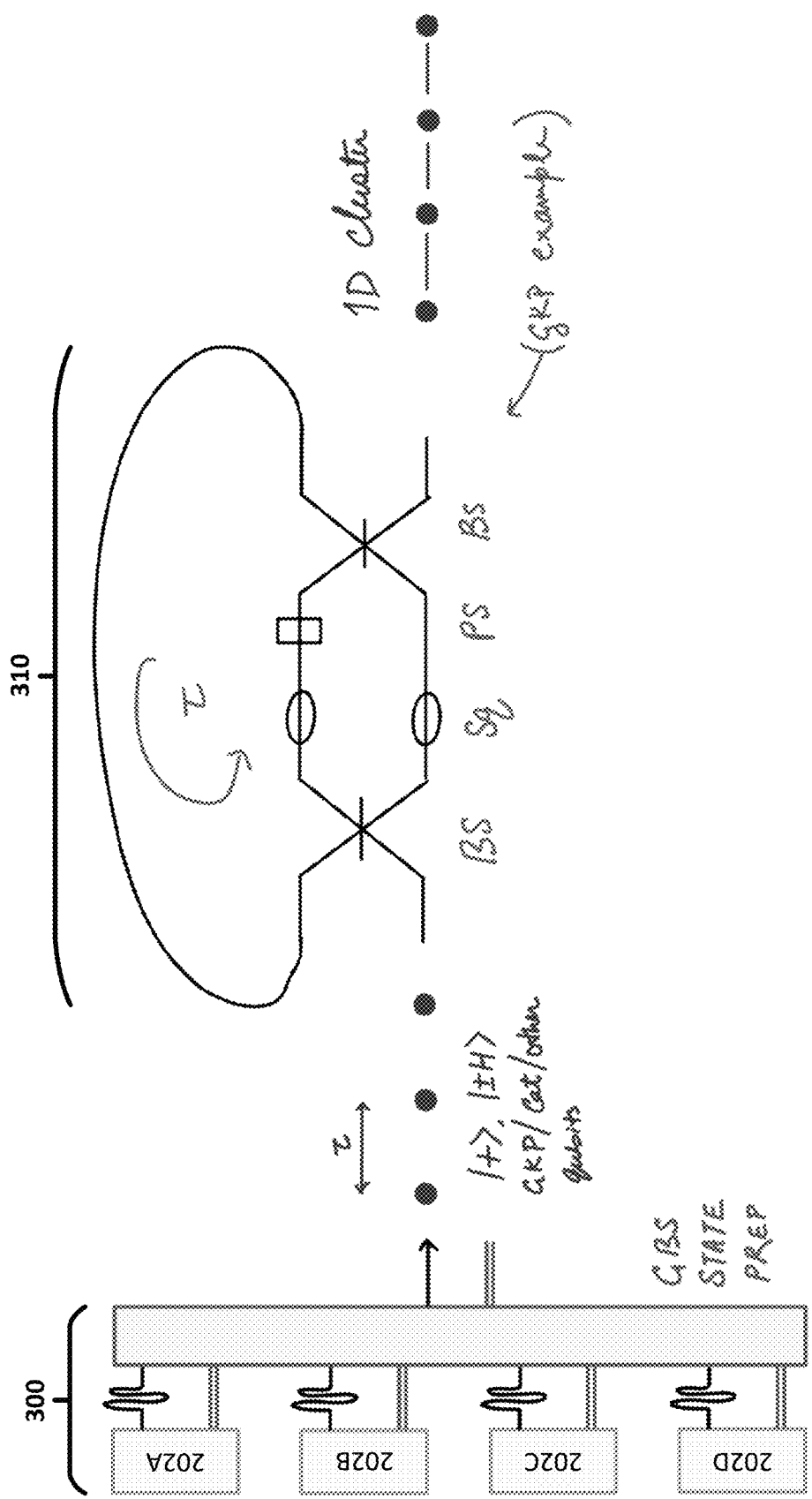

According to some embodiments of the present disclosure, cluster states are generated in one temporal dimension ("1D") using one or more optical delay lines and using a source that generates either GKP qubits or squeezed vacuum states. FIG. 3A (discussed below) depicts an example of a setup for the generation of a 1D cluster state. Alternatively, or in addition, cluster states can be generated using other bosonic qubits (e.g., involving the use of a photonic controlled-Z ("CZ") gate). CZ gates are two-qubit gates that perform two-qubit operations. The truth table for a CZ gate is as follows:

| CZ Gate | |
|---|---|
| IN | OUT |
| $\|00\rangle$ | $\|00\rangle$ |
| $\|01\rangle$ | $\|01\rangle$ |
| $\|10\rangle$ | $\|10\rangle$ |
| $\|11\rangle$ | $-\|11\rangle$ |

Figure 3C:
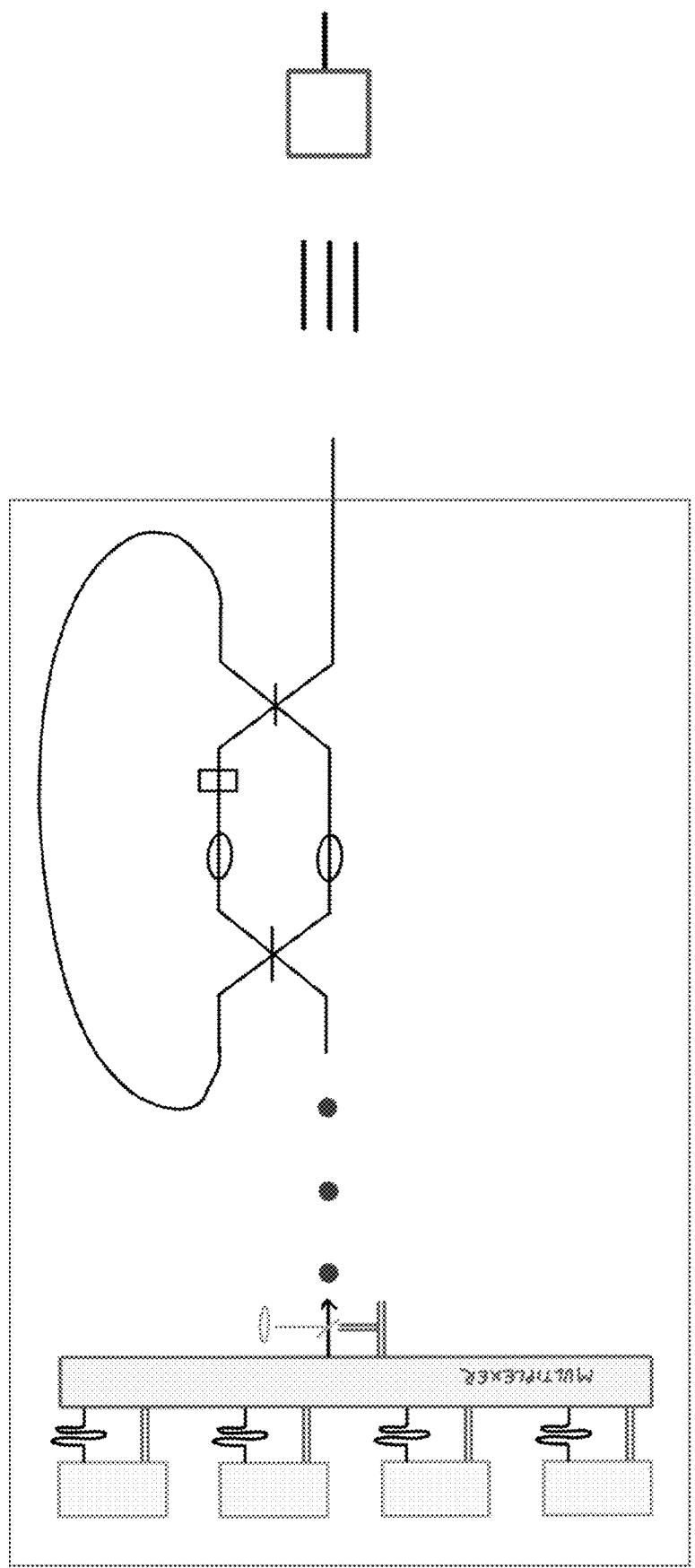
FIG. 3C is a simplified representation of the 1D qubit cluster generator of FIG. 3A.
Figure 4:
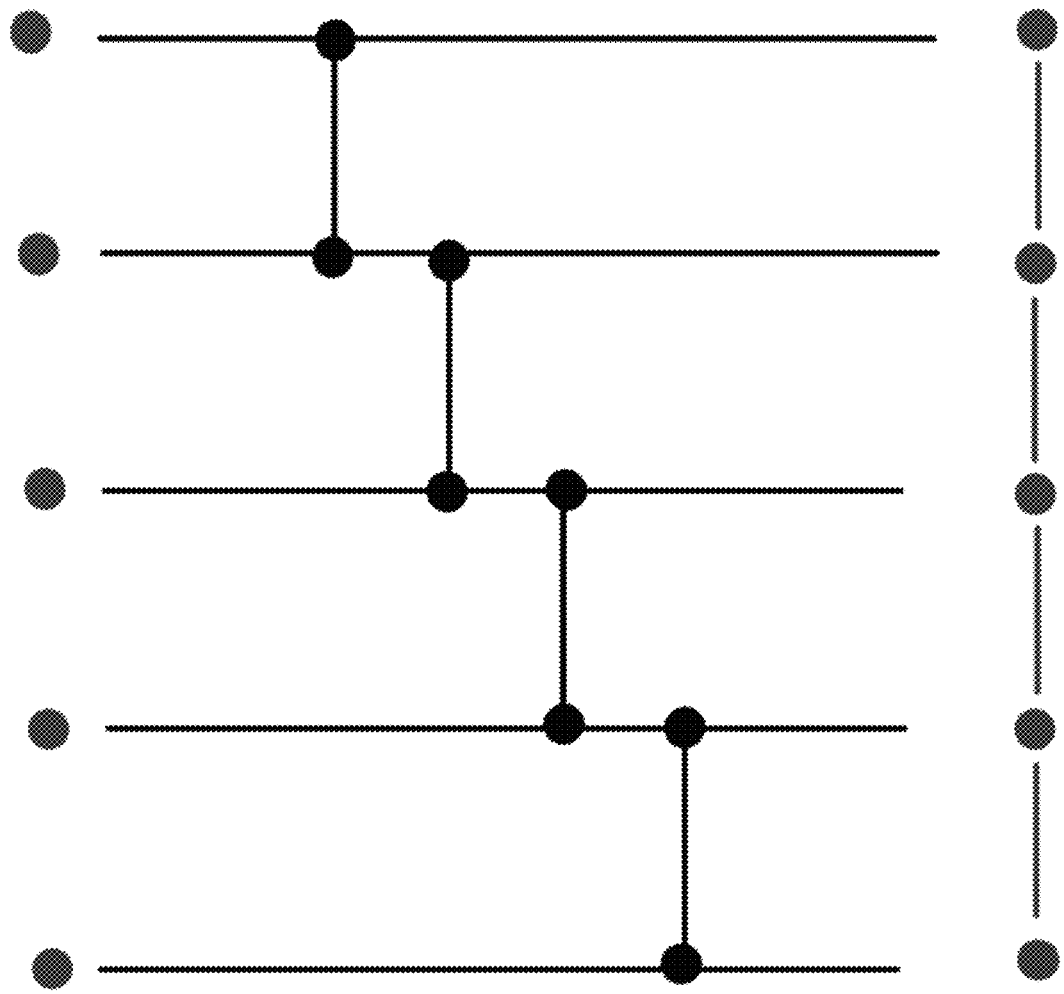
FIG. 4 is a time-domain equivalent circuit for the 1D qubit cluster generator of FIG. 3A, showing that the output is a 1D cluster state.

In some embodiments, an integrated photonic chip circuit receives, as an input, light emitted from a source (e.g., the integrated photonic device of FIGS. 2A-2C) and generated using GBS state preparation. More specifically, the modes emitted can be either $|+\rangle_{GKP}$ (in the event that the multiplexer succeeds), or momentum-squeezed states (which are injected in the event that the multiplexer does not generate a $|+\rangle_{GKP}$). A first mode is swapped using the interferometer (the operation of which is shown and described below, with reference to FIG. 3B) into the optical delay line, whose length is set to be equal to the distance between subsequent optical pulses. This first mode then returns to the interferometer and interacts with the subsequent mode at the CZ gate implemented by the interferometer (see FIG. 3B). This interaction repeats for each of the incoming modes. The effective optical circuit can be more readily visualized as an equivalent spatial representation, shown in FIG. 4. During a final step of operation, the cycling light is kicked out of the delay line by implementing a swap using the interferometer. Thus, a one-dimensional GKP cluster state is generated. A complete example device for generating a one-dimensional cluster is shown in FIG. 3C.

FIGS. 3A-3B are diagrams showing the generation of a 1D qubit cluster in the time domain, according to an embodiment. On the left side of FIG. 3A, a source 300 comprising multiplexed GBS devices 302A-302D is used to generate a sequence of pulses, where each pulse is in the $|+\rangle$ state of the chosen plurality of selected qubits. Additional details regarding the GBS devices can be found, by way of example, in U.S. patent application Ser. No. 16/997,601, filed Aug. 19, 2020 and titled "Apparatus and Methods for Generating Non-Gaussian States from Gaussian States," and in "Conversion of Gaussian States to Non-Gaussian States Using Photon-Number-Resolving Detectors," *Phys. Rev. A*, 100 (2019), the entire contents of each of which are incorporated by reference herein in their entireties.

A first qubit is sent into the loop using a swap operation (upper right in FIG. 3B). A second qubit follows the first qubit and interacts with the first qubit at a CZ gate (lower right in FIG. 3B). The output pulses are in a 1D qubit cluster state in the time domain. The interferometer 310 in FIG. 3A can act either as a swap gate or as a CZ gate, depending on the setting used. If the squeezers (labelled "Sq" in FIGS. 3A-3B) are turned off and the phase shifter (labelled "PS" in FIGS. 3A-3B) is set to $\pi$, a Mach-Zehnder interferometer with perfect reflectivity (top right in FIG. 3B) is enabled. If the phase shifter is off and the squeezers are turned on, a CZ gate (bottom right in FIG. 3B) is enabled. The generation of an N-site 1D cluster described in FIG. 3A includes performing a swap during a first clock cycle, and performing CZs during the remaining clock cycles except the last clock cycle, which (as during the first clock cycle) performs a swap to kick the light out of the loop. FIG. 3C is a simplified representation of the 1D qubit cluster generator of FIG. 3A.

GKP Cluster in 2+1 Dimensions

In some embodiments, the one-dimensional hybrid temporal cluster states described above can be stitched together into higher-dimensional cluster states, including states that can be used for performing fault-tolerant quantum computation. The generation of higher-dimensional hybrid lattices can be accomplished, for example, by the interaction of pulses from multiple one-dimensional hybrid cluster generators with CZ gates. In one embodiment, a higher-dimensional hybrid lattice is generated using one or more CZ gates that act on spatial lattices of 1D cluster and qubit sources.

Figure 5A:
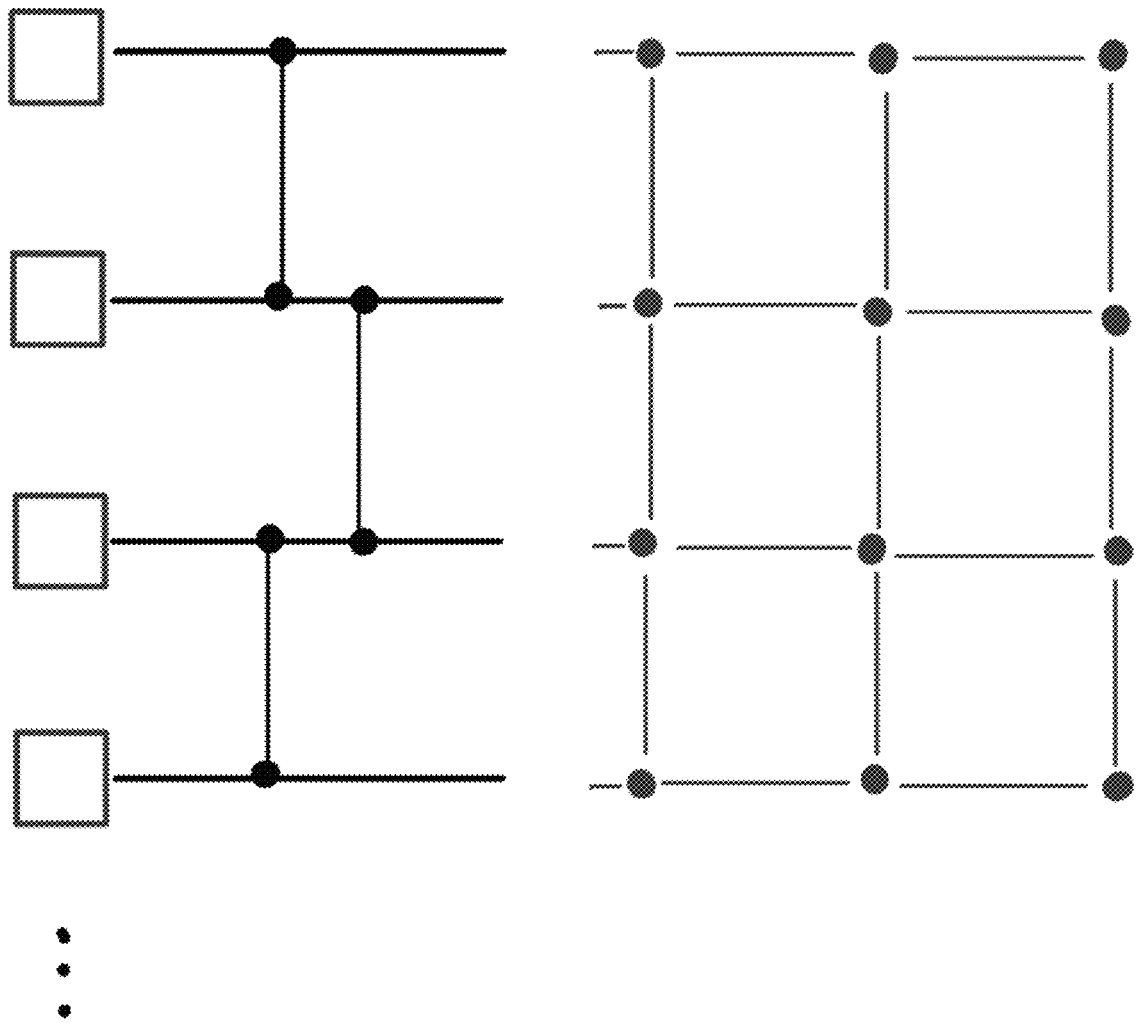
FIG. 5A is a diagram showing the generation of a (1+1)D cluster state using multiple 1D cluster generators, according to an embodiment.

In some embodiments, a 1D chain of multiple cluster generators is used to generate a (1+1)D (i.e., a 2D) cubic cluster state in one spatial dimension and one temporal dimension, as depicted in FIG. 5A. The generated 2D cubic cluster state can be stored in one or more delay lines, e.g., to allow time for feed-forward based measurements, particularly if post-selected gates are used.

Figure 5B:
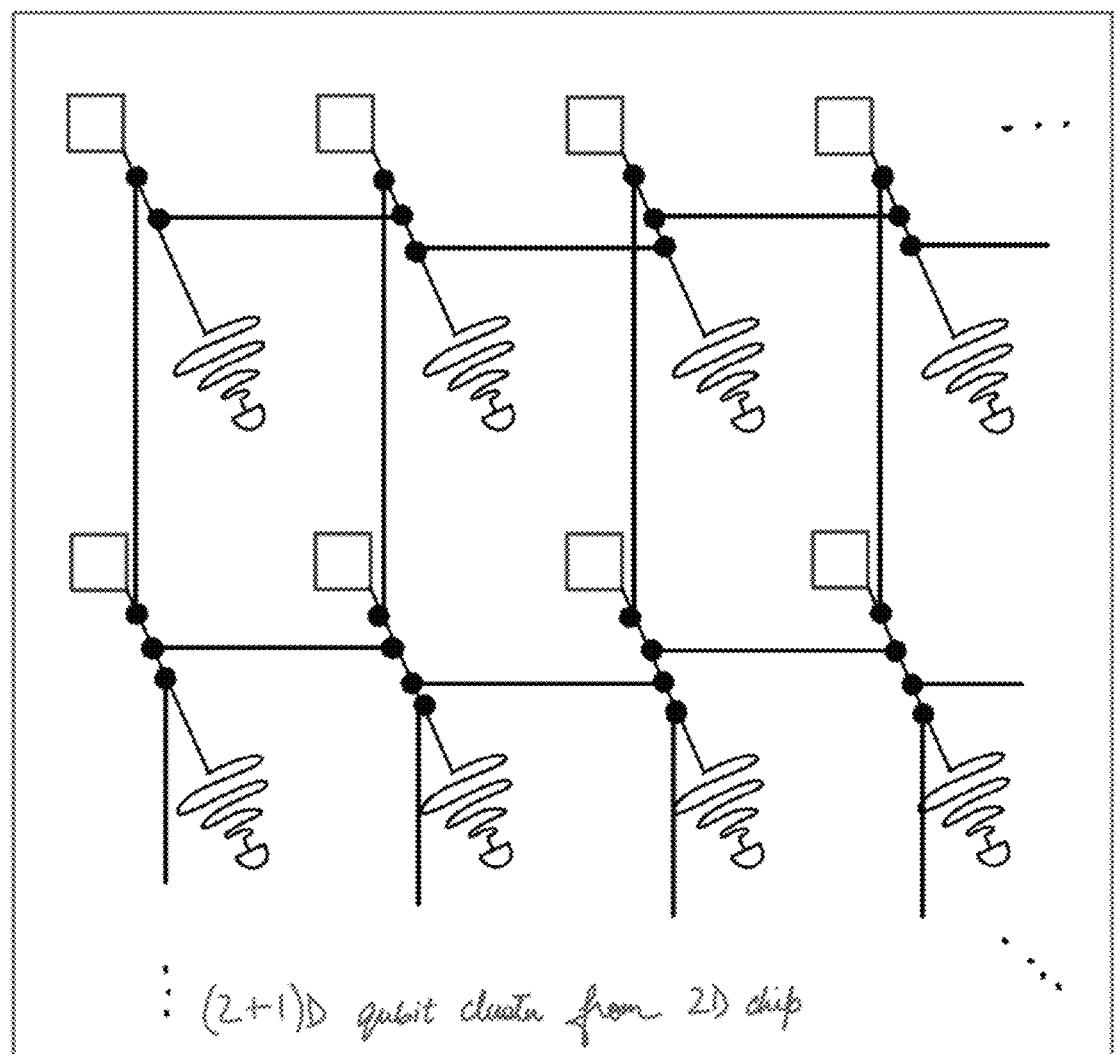
FIG. 5B is an example 2D chip layout for a (2+1)D cluster generator, according to an embodiment.
Figure 5C:
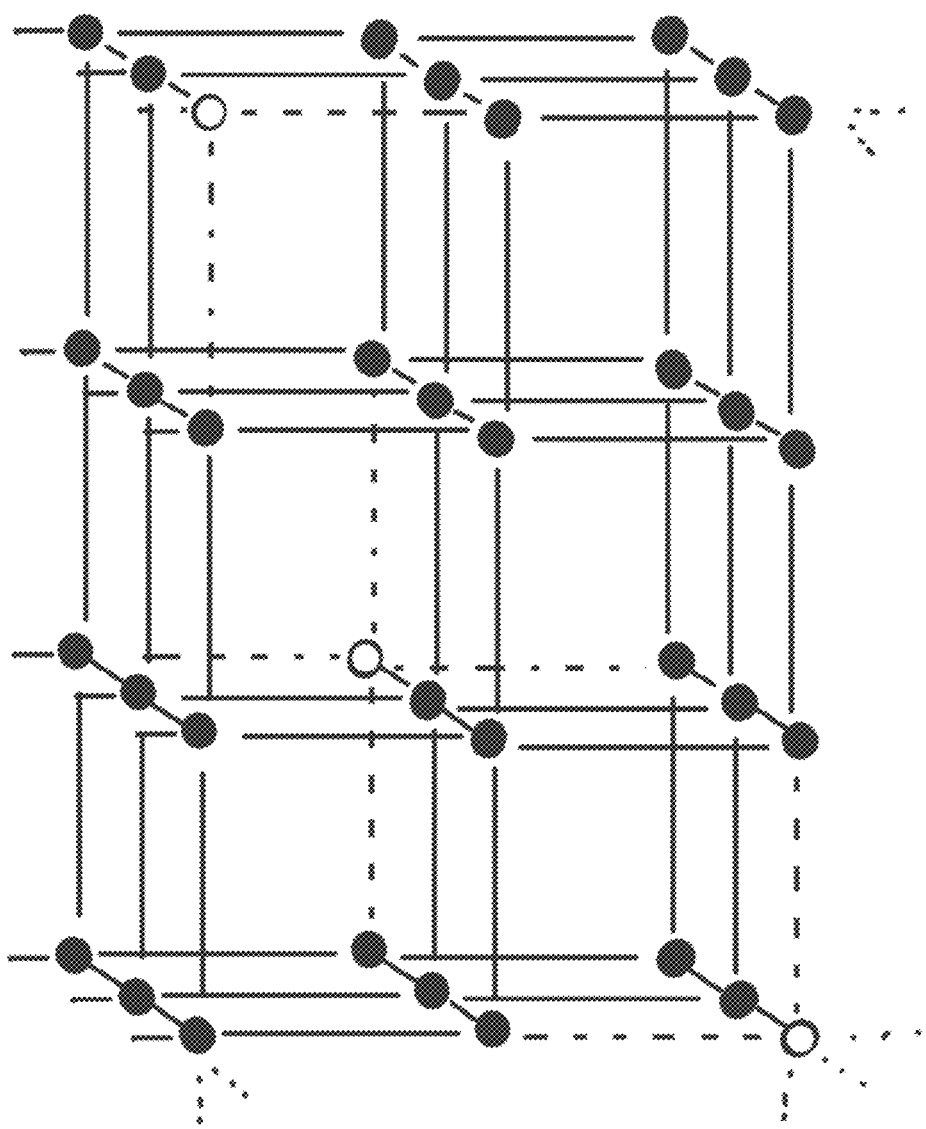
FIG. 5C shows a 3D cubic lattice generated using a 2D chip having the layout of FIG. 5B, according to an embodiment.

In other embodiments, a 3D cubic cluster state can be generated in two spatial dimensions and one temporal dimensional using a two-dimensional chip, as depicted in FIGS. 5B and 5C. More specifically, FIG. 5A shows the generation of a (1+1)D cluster state using multiple 1D cluster generators. Qubits interacting, via CZ interactions, with other qubits arriving at the same time give rise to a (1+1)D cluster state in a cubic lattice. FIG. 5B is an example 2D chip layout for a (2+1)D cluster generator, according to an embodiment. The 2D chip layout of FIG. 5B is analogous to the 1D chip, except that the sources are instead arranged in a 2D lattice over the chip. FIG. 5C shows a 3D cubic lattice generated using a 2D chip having the layout of FIG. 5B, according to an embodiment. As can be seen in FIG. 5C, there are two types of dots, reflecting the GKP$|+\rangle$ states (solid dots) and the momentum-squeezed states (hollow dots). In some implementations, other nodes might also be in the magic state, depending on the exact cluster used.

Generation of a Hybrid Raussendorf-Harrington-Goyal ("RHG") Lattice

The generation of an example cluster, namely the Raussendorf lattice (as a paradigmatic example), is discussed below, in accordance with an embodiment. Alternatively, or in addition to, the Raussendorf lattice, one or more other lattices useful for fault-tolerant quantum computation (e.g., non-foliated lattices) can also be selected, depending on the choice of quantum error correcting code, and generated using the scheme set forth herein.

Figure 6A:
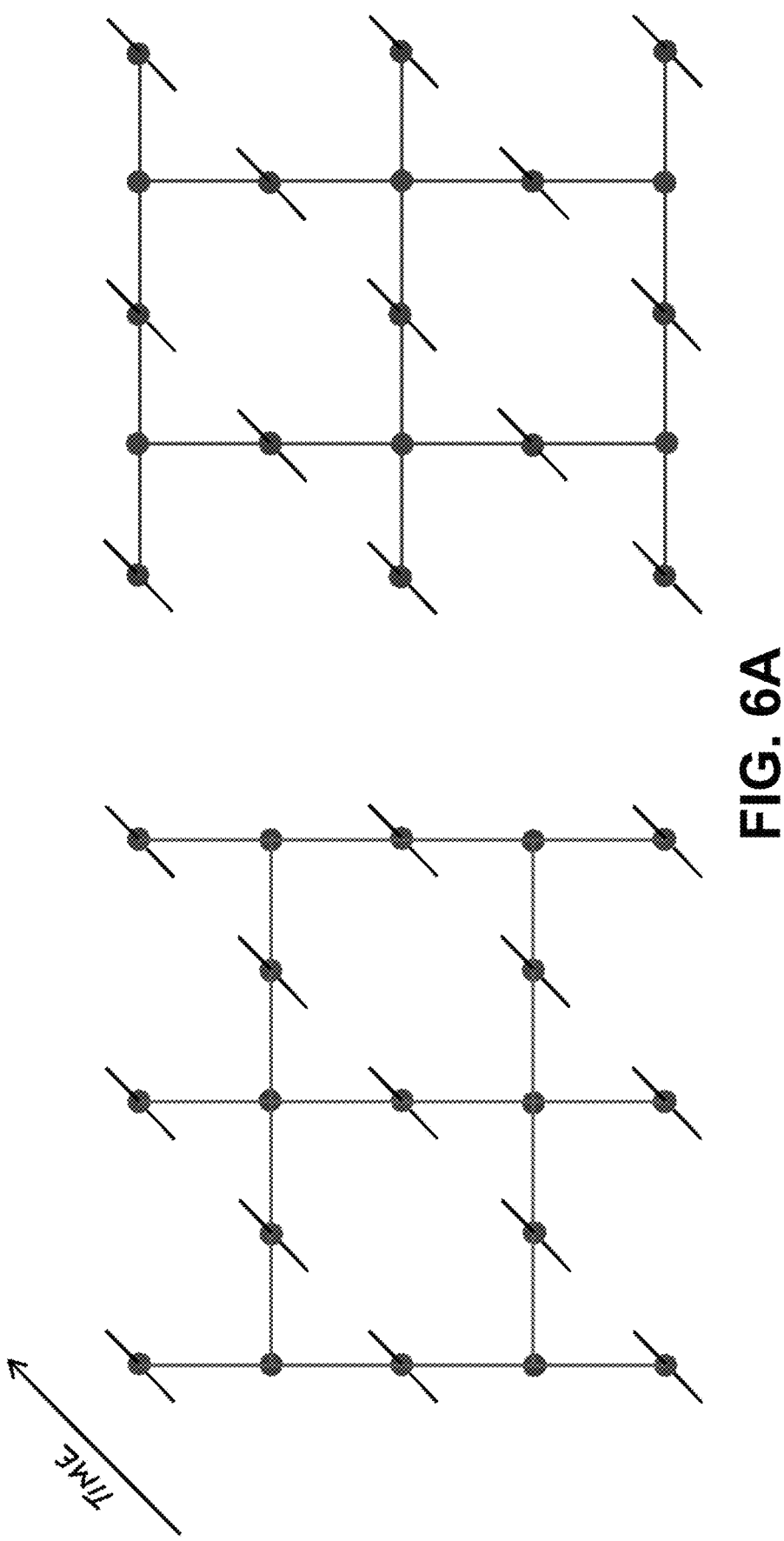
FIG. 6A shows, separately, example representations of two layers of a Raussendorf lattice.

FIG. 6A shows, separately, example representations of two layers of a Raussendorf lattice, in accordance with an embodiment. More specifically, FIG. 6A depicts alternating even and odd layers of a Raussendorf lattice. The dots represent individual computational qubits, and the connections between the dots represent entanglement. The left sub-figure of FIG. 6A represents the even layer of the Raussendorf lattice, and the right sub-figure of FIG. 6A represents the odd layer of the Raussendorf lattice. FIG. 6B is a combined representation of the two layers of the Raussendorf lattice of FIG. 6A. The dots labelled "A" represent a kind of qubit that is present in each layer and that is connected to the corresponding qubits in the next and previous layers. The dots (qubits) labelled "B" and the bonds labelled "b" are present only in the odd layers. The dots (qubits) labelled "C," and the bonds labelled "c" are present only in the odd even layer.

Figure 6C:
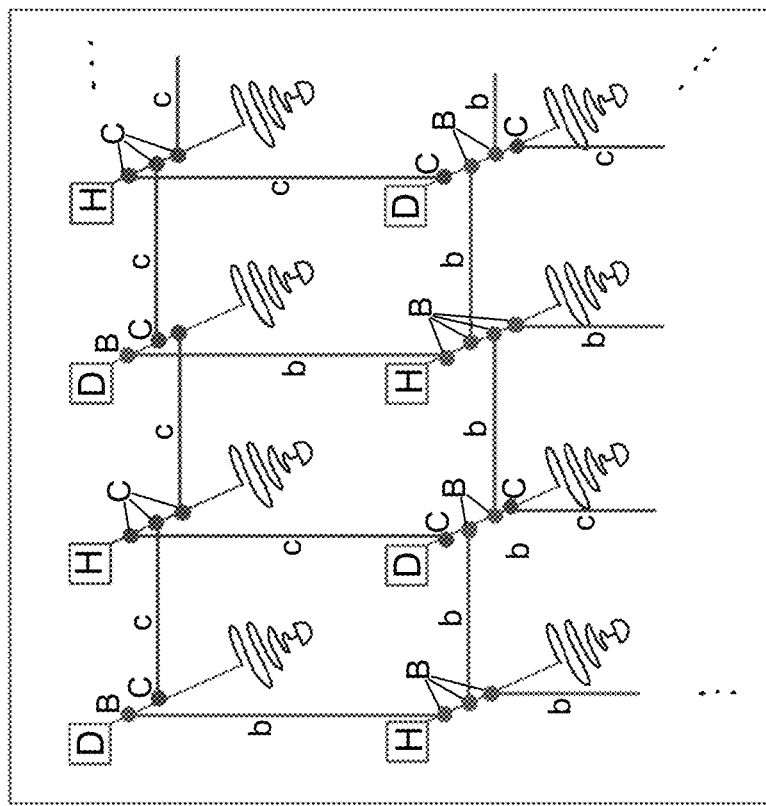
FIG. 6C shows an example chip layout, including a plurality of controlled-Z ("CZ") gates, for generating the Raussendorf lattice of FIG. 6A.
Figure 6B:
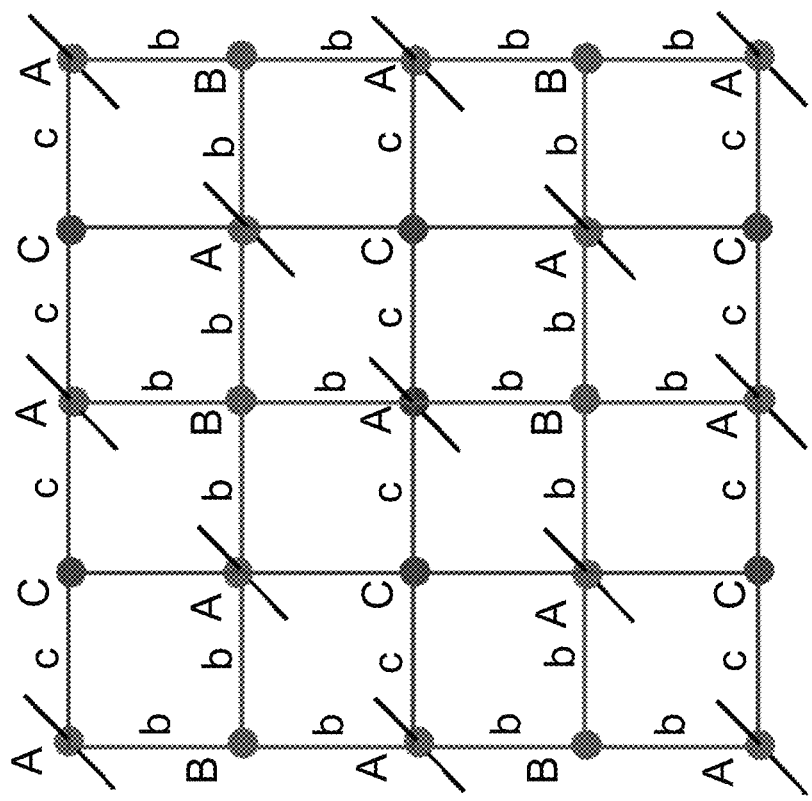
FIG. 6B is a combined representation of the two layers of the Raussendorf lattice of FIG. 6A.

FIG. 6C shows an example chip layout, including a plurality of controlled-Z ("CZ") gates (the straight lines connecting pairs of filled dots/nodes), for generating the Raussendorf lattices of FIG. 6A. The chip of FIG. 6C can include, for example, the photonic QPU 108 of FIG. 1. The layout of FIG. 6C includes two types of sources: qubit sources (such as those depicted in FIG. 2C) and 1D cluster sources (such as those depicted in FIG. 3C). During operation of the chip of FIG. 6C, qubits emitted from the qubit sources become entangled only with their spatial neighbors, i.e., with those emitted at the same time. The qubits emitted from the cluster source become entangled not only with two of their spatial neighbors, but also with modes emitted previously and subsequently. By turning half of the qubit sources on and off in alternating time steps, the Raussendorf lattice can be generated. This lattice can function as a resource for performing fault-tolerant quantum computation, as discussed further below.

As shown in FIG. 6C, three kinds of sources are put together on the chip. The boxes labelled "D" are sources of hybrid 1D cluster states, with a sequence of entangled qubits being emitted at a time delay of $\tau$. The boxes labelled "H" are hybrid qubit sources. The dots labelled "B" and "C" are qubit sources that only fire at a time delay of $2\tau$, with the "B" sources firing only at the $(2n-1)\tau$ times and the "C" sources firing only at the $(2n)\tau$ times. The lines on the chip of FIG. 6C represent CZ gates. The CZ gates labelled "b" are turned on only at odd times, and the CZ gates labelled "c" are turned on only at even times. Together, these qubits and CZ gates generate the different layers of the Raussendorf lattice and the connections between them.

Passive Version of System Configuration

Robust and stable optical quantum information can be generated by combining GKP qubits with qubit quantum error correcting codes implemented through measurement-based quantum computation (MBQC), in a hybrid continuous-variable (CV) and discrete-variable (DV) architecture. The best-known architectures of this type still have critical challenges, however, in that inline squeezing in circuit-based or measurement-based implementations of CZ gates introduce noise. In addition, the use of deterministic GKP sources can lead to high computational costs associated with multiplexing, and the desire for rapid reconfiguration in linear optics networks can present a substantial burden to ICs. Each of the foregoing elements furthermore increases the number of optical components encountered by each photon in its traversing the system, thereby compounding loss—loss being the most harmful imperfection in a photonic quantum computer.

According to some embodiments set forth herein, the outputs of probabilistic sources of GKP qubits can be entangled into fault-tolerant resource states for MBQC without the use of inline squeezing and/or without the use of reconfigurable linear optics. Architectures of the present disclosure can produce a three-dimensional macronodal lattice structure in one temporal dimension and two spatial dimensions, where each site within the lattice structure includes (or, in some implementations, consists of) four modes. In some implementations, the generation circuit may consist only of single-mode sources, a depth-4 static circuit of balanced beamsplitters, single-time step delay lines, and homodyne detectors. The generated resource state can be used in a manner similar to a CV/DV hybridized RHG cluster state, although the process is generalizable to other qubit codes. Furthermore, both the finite squeezing noise and the uniform photon loss throughout the beamsplitter network can be equivalent to the local Gaussian noise before each detector, due to the symmetry of the generation circuit.

Logical error rates of the outer (qubit) code were calculated for different levels of finite squeezing and photon loss, over a range of failure probabilities of GKP state generation. In the event that a source fails to produce a GKP state, it is assumed that a squeezed vacuum state has been produced. It was found, for example, that at 15 dB of squeezing and no loss, architectures of the present disclosure can tolerate GKP failure rates of more than 50%, reducing by a significant factor the size of the per-node state preparation modules and multiplexers of known systems. In addition, under the condition of deterministic GKP state generation, a squeezing threshold of ~10 dB was found (lower than that found of known systems), despite known systems neglecting the noise from inline squeezing within the CZ gates. The trade-off between tolerable finite squeezing noise and uniform photon loss rates for a given GKP failure rate is discussed below.

Qubits can be encoded into optical bosonic modes by GKP encoding, with ideal logical 0 and 1 codewords defined as:

$$|\bar{\mu}\rangle = \Sigma_n |(2n+\mu)\sqrt{\pi}\rangle_q, \mu=0,1, \quad (1)$$

where $\mu$ is a placeholder for the values 0 or 1; $\bar{\mu}$ denotes a logical GKP state; n is an index spanning all integers; $|\cdot\rangle_q |\cdot\rangle_g$ is a position eigenstate. As presented herein, single-mode states within the GKP code space are indicated with an overbar. Given a single-mode squeezer $S(\xi) := \exp(-i(\ln \xi)(\hat{q}\hat{p}+\hat{p}\hat{q}))$, with $S(\xi)$ being the mathematical representation of a squeezing unitary gate with squeezing parameter $\xi$, and $\hat{q}/\hat{p}$ the quadrature operators (position/momentum) of the quantum harmonic oscillator, the additional states used can include a momentum eigenstate $|0\rangle_p$, the sensor state $|\varnothing\rangle = S(\sqrt{2})|\bar{+}\rangle$, and a magic state such as $S(\sqrt{2})|+T\rangle$ where $$|+T\rangle := \frac{1}{\sqrt{2}}(|0\rangle + e^{\frac{\pi}{4}i}|1\rangle),$$

the last of which is used to implement non-Clifford operations.

The effects of finite squeezing can be modelled via the application of an additive Gaussian bosonic channel on the ideal $|0\rangle_p$ and $|\varnothing\rangle$ states:

$$\mathcal{N}[\epsilon](\rho) := \int\int \frac{drds}{2\pi\epsilon} e^{-\frac{r^2}{2\epsilon}-\frac{s^2}{2\epsilon}} X(r)Z(s)\rho Z^\dagger(s)X^\dagger(r), \quad (2)$$

where $\rho$ denotes the density matrix of the quantum state of a single bosonic mode, where $X(r):=\exp(-ir\hat{p})$ and $Z(s):=\exp(is\hat{q})$ are displacements along the position and momentum phase-space directions, respectively.

Figure 13:
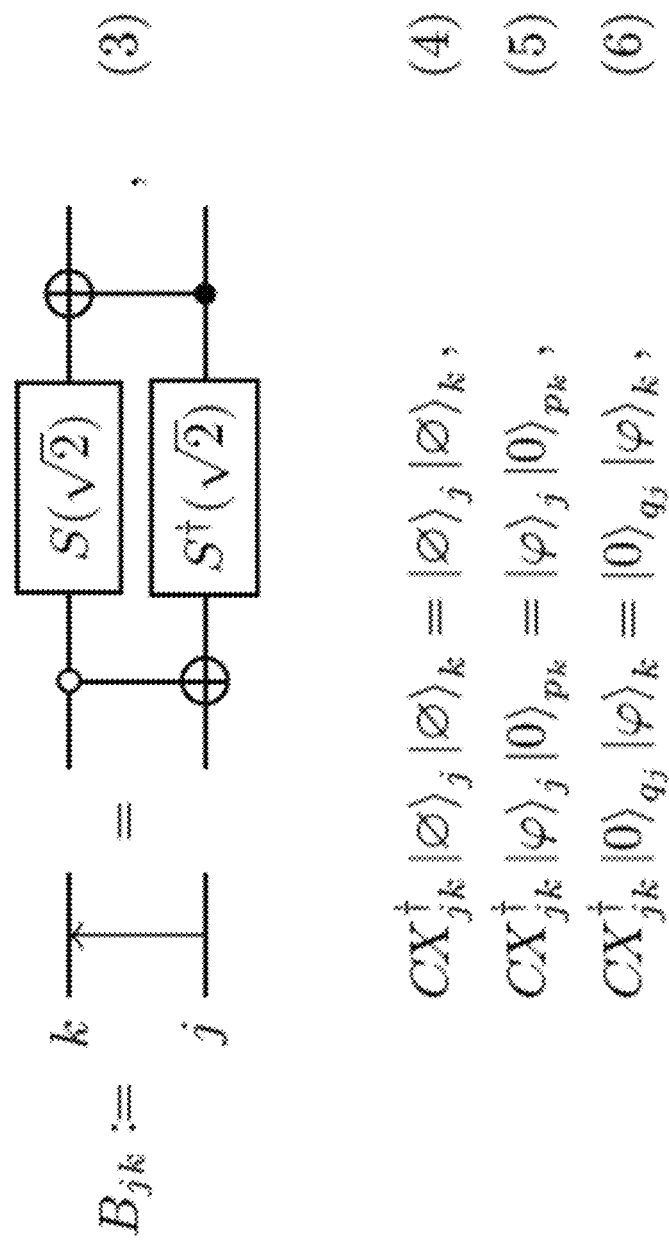
FIG. 13 shows identities in support of an equivalence between a two-mode entangled state and two-mode cluster states, according to an embodiment.

The 50:50 beamsplitter is defined as $B_{jk} := e^{-i\pi(\hat{q}_j\hat{p}_k - \hat{p}_j\hat{q}_k)/4} = B_{kj}^\dagger$, and depicted by an arrow from mode $j$ to $k$ (see FIG. 13 at Eq. (3)). The phase shifter is defined as $R(\theta) := e^{i\theta\hat{n}}$, with $R(\pi/2)$ corresponding to a Fourier transform in phase space, which implements a GKP Hadamard gate. Homodyne detectors measure linear combinations of the quadrature operators, with $\hat{q}$, $\hat{p}$, and $\hat{q}+\hat{p}$ measurements implementing GKP Pauli Z, X, and Y measurements, respectively. The single-mode squeezed vacuum state is given by $S(\xi)|0\rangle$ with $\ln \xi \rightarrow \pm \infty$ being $|0\rangle_{p(q)}$. The CV CZ gate is defined as $CZ_{jk} := e^{i\hat{q}j\hat{q}k}$, and the CV CX gate as $CX_{jk} = e^{-i\hat{q}j\hat{p}k}$. These implement GKP CZ and CX gates, respectively. Herein, $CX_{jk}$ is differentiated from $CX_{jk}^\dagger$ by using a solid circle vs. an open circle on the control mode j, respectively (see, e.g., FIG. 13). Finally, GKP Pauli X and Z operators are realized by displacements of any odd-integer-multiple of $\sqrt{\pi}$ in the q and p quadratures, respectively 3D Hybrid Macronode Architecture A constant-depth generation circuit has been proposed for the RHG lattice state compatible with probabilistic GKP state sources. This proposal remains experimentally challenging, however, because it involves the use of inline squeezing (present in the CZ gates) and time-varying circuits (i.e., different gate arrangements between even and odd time steps). Each of the foregoing issues can be circumvented by substituting the RHG lattice target state with a computationally equivalent macronode cluster state, where each node has several modes that undergo multi-mode measurement.

Figure 12:
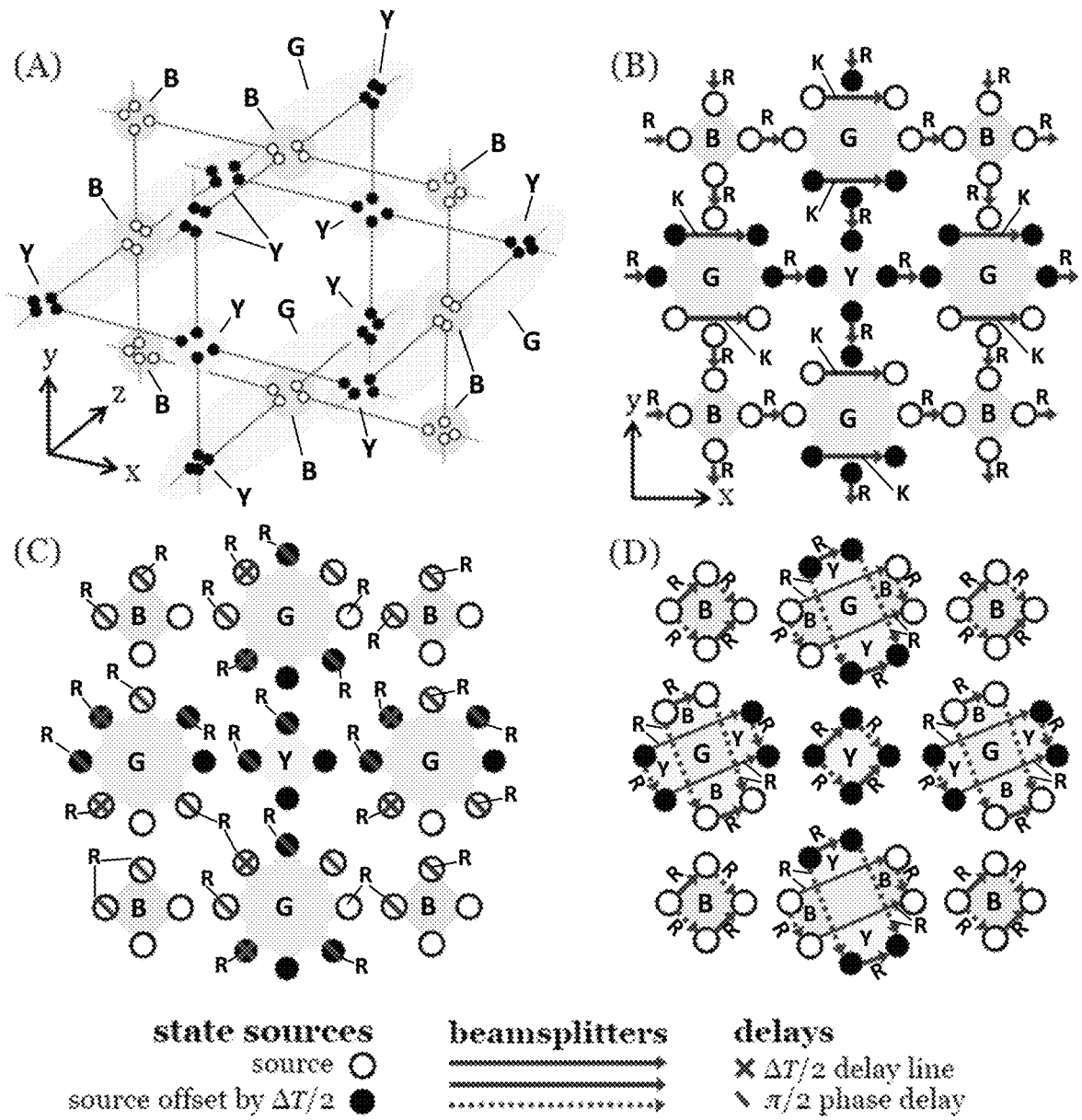
FIG. 12 shows a primal unit cell of a 3D hybrid pair macronode cluster state, and the steps for generating it in accordance with some embodiments.

FIG. 12, at inset (A), shows the primal unit cell of the 3D hybrid pair cluster state, and insets (B)-(C) show the steps for generating it, in accordance with some embodiments. Insets (B)-(D) of FIG. 12 are presented as cross-sections of waveguide layers stacked in the Z direction, which coincides with the direction of propagation of light through the waveguides. The 3D lattice exists in two spatial (X, Y) dimensions and one temporal dimension. The latter is divided into discrete time-bins of width $\Delta T$. Colors (denoted by labels "G" for green, "B" for blue, "Y" for yellow, "R" for red, and "K" for black) are included in FIG. 12, to show the relationship between sources and the final state. Yellow and blue indicate even or odd time signatures. Macronodes on top of blue shapes correspond to blue macronodes in inset (A). Macronodes on top of yellow shapes correspond to yellow macronodes in (A). Macronodes on top of green shapes correspond to the green region in inset (A) (i.e., partly to blue, and partly to yellow). Red arrows (labelled "R") represent spatial connections, and black arrows (labelled "K") represent temporal connections. Inset (B) of FIG. 12 shows the waveguide arrangement at a first layer, with each node receiving an input from a source in every $\Delta T$-wide time bin. The time bins for the solid nodes are offset by $\Delta T/2$, relative to the hollow nodes. 50:50 beamsplitters are applied between pairs of modes as indicated by the arrows, and these generate entangled pairs (see Eq. (7), below). The beamsplitters indicated by black arrows create entangled pairs that will connect the state in the Z direction. In inset (C) of FIG. 12, Xs indicate the application of a $\Delta T/2$ time-delay line, while diagonal slashes indicate the application of a $\pi/2$ phase delay. In inset (D) of FIG. 12, the state is connected into the macronode cluster state by the application of four additional beamsplitters between the four modes that make up each macronode. Beamsplitters shown in dotted lines are applied after those shown by solid lines. Notice that the time signature of certain nodes changes due to the time-delay lines.

Figure 14:
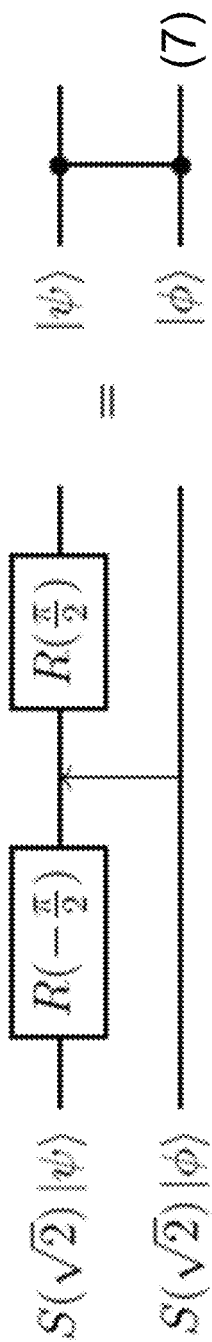
FIG. 14 is an equivalence between a two-mode cluster state generated with and without CZ gates, resulting from the identities of FIG. 13.

In some embodiments, a basic building block of a 3D hybrid pair cluster state is a type of two-mode entangled state, which can be produced by first generating a pair of modes either being GKP or momentum squeezed vacuum, and sending the pair of modes through a 50:50 beamsplitter. Though the constituent modes are coupled only by a beamsplitter, the resulting pairs are equivalent to two-mode cluster states, as is made apparent by the identities shown in FIG. 13 (equations 3 through 6), where $|\varphi\rangle$ can be an arbitrary state. From these identities, the state diagram shown in FIG. 14 can be obtained, provided that both $|\psi\rangle$ and $|\phi\rangle$ are $|+\rangle$, or at least one of the states $|\psi\rangle$, $|\phi\rangle$ is in $|0\rangle_p$. Even if one has access only to either $|\varnothing\rangle$ or $|0\rangle_p$ at random, one always obtains an entangled state that functions as a unit of a hybrid CV-GKP qubit cluster. Magic states can be inserted into this architecture by letting $|\psi\rangle$ or $|\phi\rangle$ be a magic state such as $|+T\rangle$, while letting the other be $|0\rangle_p$. Additional details regarding the creation of (two-mode) GKP EPR states and GKP/CV entangled states can be found, by way of example, in "Continuous-Variable Gate Teleportation and Bosonic-Code Error Correction," by B. Walshe, et al., *Physical Review A* (102), December 2020, the entire content of which is incorporated herein by reference in its entirety for all purposes.

In some implementations, the entangled pairs are arranged in a 3D configuration, shown in FIG. 12 at inset (A). To achieve this, begin with a 2D array of sources that emit $|\varnothing\rangle$ with probability $1-p_{swap}$ and momentum-squeezed states with probability $p_{swap}$ at regular intervals. Assume the desired probabilities $p_{swap}$ may arise from multiplexing multiple GBS sources for each effective source. It can be specified that each source produces an input mode every time step of length $\Delta T$, though the timing of half of the sources can be offset by $\Delta T/2$ according to its location in the 2D layout in FIG. 12 at inset (B). The beamsplitters, delay lines, and phase delays in FIG. 12 at insets (B) and (C) produce the desired arrangement of pair states in (2+1) dimensions.

To create a fully connected 3D resource state, four 50:50 beamsplitters can be applied within each macronode, as shown in FIG. 12 at inset (D), analogously to a quad-rail lattice construction. A detailed graphical representation of the resulting state is given in the "Entanglement Structure" section below. Each mode is subsequently sent to a homodyne detector.

Equivalence to the Canonical Hybrid Cluster State

In some embodiments, a hybrid RHG cluster state is used as a canonical RHG lattice state since there is one mode per node and its generation involves CZ gates. The state produced by the circuit in FIG. 12 is a macronode version of this state. The case of always measuring three modes, referred to as satellite modes, is considered within a macronode in the $\hat{q}$ basis. The remaining mode, referred to as central mode, then forms the canonical RHG lattice state. This can be proven this through circuit identities, as discussed below with reference to FIG. 15.

Figure 15:
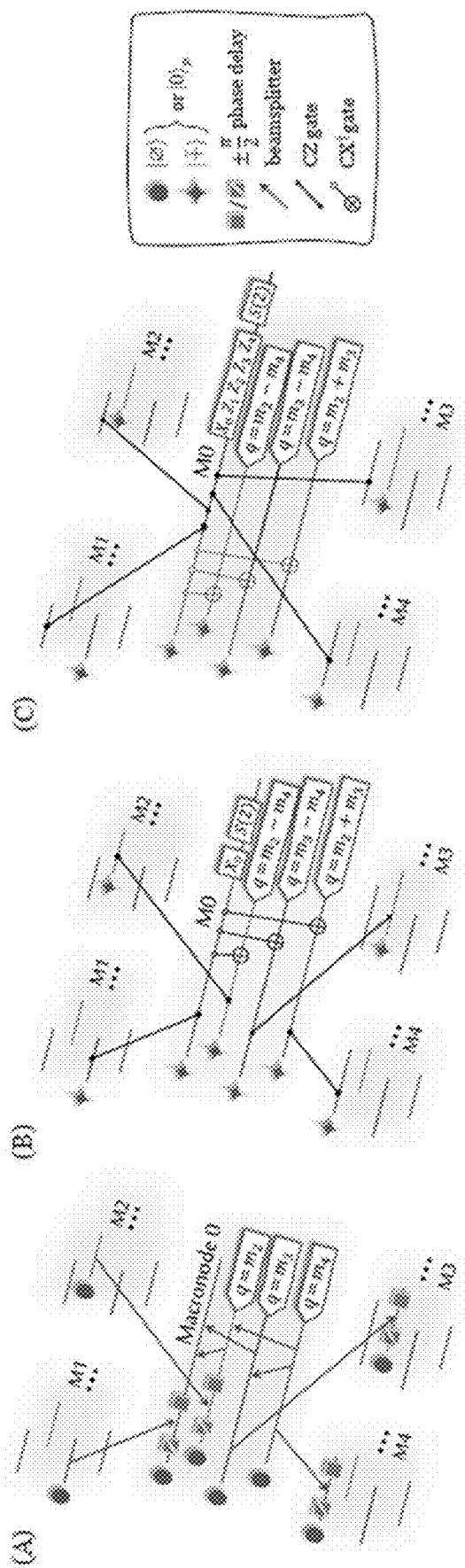
FIG. 15 shows a circuit representation of a beamsplitters network associated with a single macronode, and its relationship with adjacent macronodes, along with equivalent circuit representations thereof, according to an embodiment.

FIG. 15 at inset (A) shows a circuit representation of a beamsplitter network associated with a single macronode, 0, in the case where the central mode is the top wire. Also shown is the connectivity, by beamsplitters, to neighboring macronodes. The circuit conventions are provided in the legend of FIG. 15. The final four beamsplitters correspond to those in FIG. 12 at inset (D). FIG. 15 at inset (B) shows an equivalent circuit to inset (A), which follows from application of the identity of FIG. 14. $X_0$ denotes displacement $X((m_2+m_3/2)$. S is the squeezing gate, whose effect is to rescale the homodyne outcomes. FIG. 12 at inset (C) shows an equivalent circuit to inset (B), which follows from circuit identities that migrate CZ gates toward the measurements. The commuted $CX^\dagger$ gates are depicted with a dotted line because they act trivially on the circuit input. The displacements $Z_1; \ldots, _4$ depend on the measurement outcomes of satellite modes in the neighboring macronodes.

To economize the description of the post-measurement state, the central mode in each macronode can be chosen from wires whose inputs are prepared in GKP states, whenever possible. Representing the state generation and measurement via a quantum circuit, it is possible to further economize to the case where the central mode is taken to be the top wire shown in FIG. 15 at inset (A), as other cases can be made equivalent to this one by permuting the measurement bases at the end. Using Eqs. (3) and (7), the beamsplitters can be replaced with CX(†) gates and squeezers. At the measurement side, applying the commutation relations between gates X(a), S(ξ) and $CX_{jk}$, as well as the identities $\langle m|_q X(a) = \langle m-a|_q$, $\langle m|_q S(\xi) \propto \langle m/\xi|_q$, and $\langle m|_{q1} CX_{1k} = \langle m|_{q1} X_k$ (m) for homodyne measurements, yields the equivalent circuit shown in FIG. 15 at inset (B). Next, all the CZ gates are commuted across the CX gates, towards the measurements, using the relation $CX_{1k}^\dagger CZ_{jk} = CZ_{jk} CZ_{j1} CX_{1k}^\dagger$. This generates additional CZ gates, but those with support on satellite modes can be replaced with displacements by the identity $\langle m|_{qk} CZ_{jk} = \langle m|_{qk} Z_j(m)$. These changes are shown in FIG. 15 at inset (C).

Since the central mode is assumed to be an encoded GKP state $|\bar{\psi}\rangle_1$ either a plus state or a magic state—if the macronode contains at least one GKP state, then, by using Eq. (5) and:

$$CX_{jk}^\dagger |\bar{\psi}\rangle_j |\mp\rangle_k = |\bar{\psi}\rangle_j |\mp\rangle_k, \quad (8)$$

the $CX_{1j}^\dagger$ ($j \in \{2,3,4\}$) gates that act at the beginning of the circuit in FIG. 15 at inset (C) can be removed. The satellite modes are thereby decoupled from the entanglement structure, and the state supported on just the central modes of each macronode is identical to a hybrid RHG lattice—up to squeezing (S(2)) and displacement operators ($X_0$ and $Z_1$-$Z_4$), whose effect can be eliminated in post-processing. Thus far, the effects of finite squeezing and photon loss have not been considered, however they are address in the following section.

Noise Model

Any single-mode Gaussian bosonic channel ε that preserves the phase-space mean of the vacuum state satisfies:

$$B_{jk}(\varepsilon_j \otimes \varepsilon_k(\cdot))B_{jk}^\dagger = \varepsilon_j \otimes \varepsilon_k(B_{jk}(1\cdot)B_{jk}^\dagger) \quad (9)$$

Furthermore, if ε is also isotropic with respect to phase-space quadratures, then:

$$R(\theta)(\varepsilon(\cdot))R^\dagger(\theta) = \varepsilon(R(\theta)(\cdot)R^\dagger(\theta)) \quad (10)$$

From these identities, it follows that uniform photon loss occurring just before the beamsplitter layers in FIG. 12 at insets (B-D) can be combined and commuted across to act immediately before the layer of homodyne detectors in FIG. 15 at inset (A). Let η denote the total transmission coefficient of the accumulated losses acting before each detector. By rescaling the homodyne outcomes by $1/\sqrt{\eta}$, the accumulated loss channel can be replaced with a Gaussian random displacement channel with variance $$\sigma_{loss}^2 = \frac{1-\eta}{2\eta}.$$

Finite squeezing noise, modelled as a Gaussian random displacement with $\sigma_{fin.\ sq.}^2$ as shown in Eq. (2) acting on the raw outputs of the sources, can similarly be commuted across all the optical elements so that the finite squeezing noise acts before the homodyne detectors. The combined effects of both losses and finite squeezing noise lead to homodyne outcomes with an uncertainty drawn from a normal distribution with variance $\sigma_{total}^2 = \sigma_{fin.\ sq.}^2 + \sigma_{loss}^2$.

Once the photon loss and finite squeezing noise are accounted for as Gaussian random noise in the measurement data, one is free to apply the reduction to the canonical RHG lattice state described above. Reinterpreting this noisy measurement data to undo the conditional displacements (a.k.a. byproduct operators) on the central mode in FIG. 15 at inset (C), however, will further distort the homodyne outcome of the central mode.

Threshold Calculations

The correctable region for a macronode resource state can be found through Monte Carlo simulations, where each trial comprises of three steps: simulating the complete macronode RHG lattice prepared in FIG. 12, reducing it to the canonical lattice, and performing error correction on the reduced lattice.

The noisy homodyne outcomes of the macronode lattice are generated by first sampling the (ideal) quadratures, applying the entangling gates, and then using them as the means of a normal distribution with a covariance matrix $\sigma_{total}^2$). This model corresponds to uniform Gaussian pre-detection noise. Following the above-described reduction procedure, noise on the central modes originates from both the generation circuit and from the byproduct operators. Conditional qubit-level error probabilities can then be estimated and used for decoding of the higher-level code, for example using minimum-weight-perfect matching.

In the case where all modes are in GKP states, a swap-out probability $p_{swap}$ threshold of 10.1 dB was found. With the additional restriction that every macronode has exactly one GKP state, the threshold becomes 13.6 dB. There is a marked improvement in the swap-out tolerance of the passive architecture: it is approximately 71%, as contrasted with ~24% for some known active architectures.

Without wishing to be bound by theory, the inventors posit two primary reasons for the observed improvement. First, swapping a GKP mode with a momentum squeezed state introduces noise correlated among its neighbors. Analysis reveals that a reduced lattice will have an effective momentum squeezed state only if all four modes in the pre-reduced macronode were swapped out. Thus, the redundancy in the macronode lattice results in a greater tolerance to swap outs. Second, byproduct operators conditioned on the measurements of neighboring GKP states are binned, and thus do not propagate Gaussian noise. In fact, every additional GKP state present in a given macronode provides an additional degree of local GKP error correction.

Known research has shown how quantum error correction (in the form of a topologically protected cluster state) can be used for photonic quantum computation with probabilistic sources of GKP qubits, provided that the available squeezing is sufficiently high. Such research, however, has presumed systems with both inline squeezing and time-varying beamsplitters, both of which are difficult to implement at desired noise levels. By using a static linear-optical circuit to generate a macronode lattice, architectures described herein, according to some embodiments, circumvent such obstacles, thereby making it feasible to implement topological error correction at desirable (i.e., optimally low) noise levels.

In some embodiments, systems for generating hybrid cluster states described herein do not use experimentally demanding CZ gates, which were previously assumed ideal among researchers, and have been shown to substantially degrade the quality of the state. The culprit of such degradation is believed to be inline squeezing. Embodiments set forth herein avoid such degradation by migrating all squeezing with the aid of circuit identities—either to the input of the circuit, where it can be absorbed into the state preparation, or to the output, where it manifests as classical processing of the homodyne measurement outcomes. Furthermore, by doubling the number of modes at sites with connectivity in the Z direction, the need for reconfigurability of optical elements in the cluster state generation circuit can be eliminated. The only remaining reconfigurable components are in the multiplexed sources of individual GKP states (where switches are used), and in the local oscillator phase of each homodyne detector.

By exploiting the symmetry of a resource generation circuit, both uniform loss and finite squeezing effects can be consolidated into a combined Gaussian noise associated with each detector. Such a model reveals that finite squeezing noise and photon losses can be treated on the same footing, facilitating unprecedented reductions in noise.

Circuit identities reveal the built-in redundancy supplied by satellite modes of resource states described herein, arising from the permutation symmetry of the generation circuit. Having multiple GKP states per macronode is tantamount to additional rounds of GKP error correction, which keeps the threshold around 10 dB in an all-GKP case. Bestowing a macronode with even just one GKP state, however, means the encoded state at each site still behaves like a GKP state, leading to significantly higher tolerance to swap-outs. At 15 dB—the current highest reported level of optical squeezing observed (for a squeezed vacuum in bulk optics) embodiments set forth herein can accommodate the replacement of more than half of its GKP states by momentum-squeezed states. This means that the increase in the number of modes of the cluster is balanced by a corresponding decrease in the number of probabilistic state sources in every node, which significantly relaxes the multiplexing requirements. Taken together, the results achievable by systems of the present disclosure substantially facilitate the realization of a fault-tolerant and scalable photonic quantum computer.

Entanglement Structure

Figure 16:
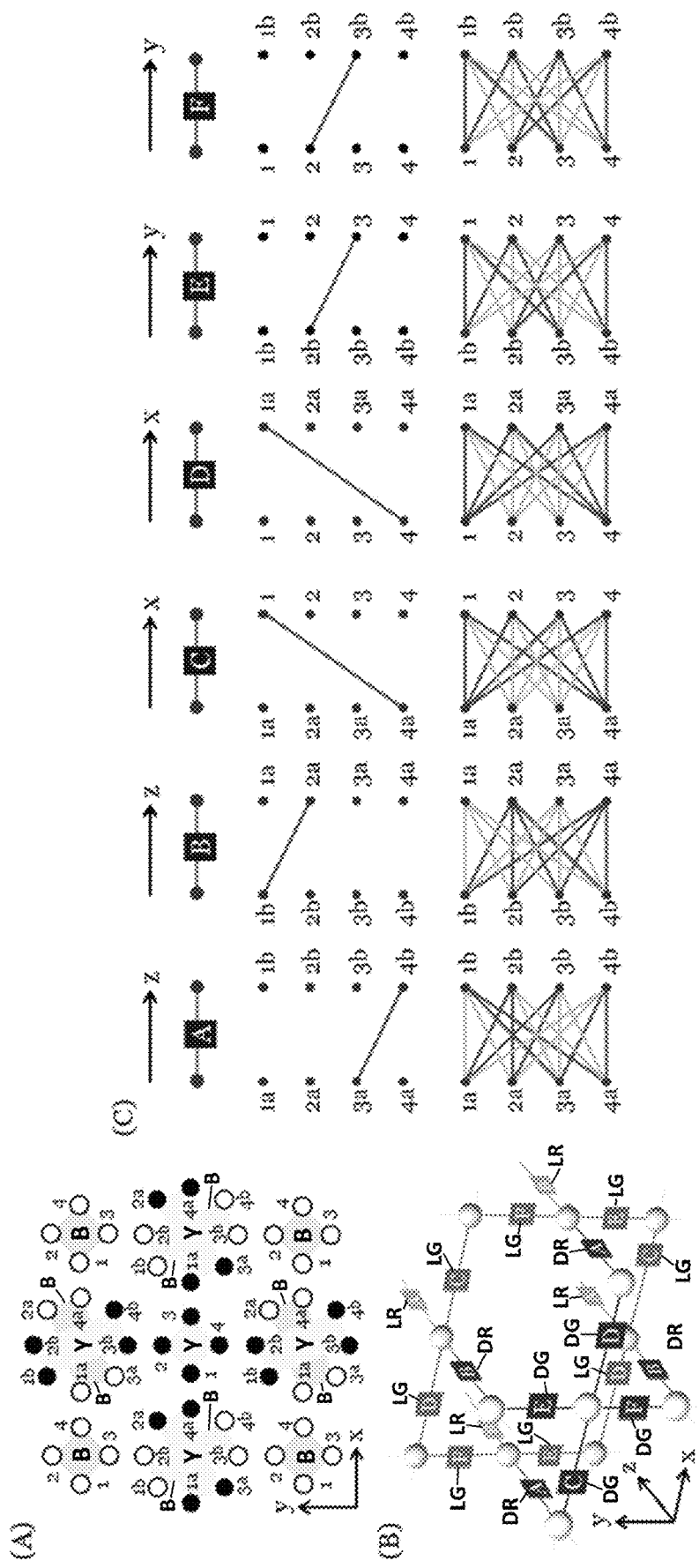
FIG. 16 is a diagram showing the arrangement of modes and a disambiguation of edges of a hybrid macronode 3D cluster state, according to an embodiment.

The following describes the relationship between the generation circuit and the entanglement structure of the resulting state. After the state generation stages shown in FIG. 12 at insets (C) and (D), the array of modes is as shown in FIG. 16 at inset (A). FIG. 16 shows a graph of the hybrid macronode 3D cluster state. Inset (A) of FIG. 16 shows the 2D mode layout, with $\Delta T/2$ offset modes consistent with insets (C) and (D) in FIG. 12—i.e., modes at solid nodes are offset in time by $\Delta T/2$ relative to the modes at hollow nod. Each macronode consists of four modes, labelled 1-4. Inset (B) of FIG. 16 shows the three-dimensional arrangement of the four-mode macronodes. For clarity, the plaques with letters A to F have a color corresponding to a given letter, with lighter colors in deeper layers (green colors, for the X and Y direction, and red color for the Z direction; light green is labelled "LG," dark green is labelled "DG," light red is labelled "LR," and dark red is labelled "DR"). Five modes are omitted from the unit cell, corresponding to the back face of the cube. The connectivity in the XY plane is identical to the front face. Inset (C) of FIG. 16 shows macronode graph edges for each bond in inset (B). The top six configurations correspond to weight-1 CZ gates, connecting pairs of modes as in FIG. 12 at inset (A). The bottom six configurations correspond to weight +/−¼ CZ gates (the darker edges being positive and the lighter edges being negative), showing connectivity of the modes after the stage shown in inset (D) in FIG. 12.

Recall that the solid nodes in FIG. 12 indicate that these lattice sites are present in temporal modes, offset by $\Delta T/2$ relative to those in hollow nodes. The grouping of modes into macronodes is indicated by yellow (blue) squares and rectangles, also indicating that those macronodes are offset (not offset) by $\Delta T/2$. When the resource is constructed up to the point between stages C and D in FIG. 12, it is equivalent to a projected entangled pair state (PEPS) for the CV/DV RHG cluster state, as shown in FIG. 12 at inset (A). The precise identification of waveguide modes with graph nodes is given in FIG. 16.

As described herein, a four-to-one reduction of modes for each macronode can correspond to applying projectors equivalent to doing four beamsplitters and three homodyne measurements. Other measurements can likewise be performed after the beamsplitters (resulting in operations more general than what can be achieved on the canonical lattice). The four-layer graph for the state after beamsplitters but before any homodyne measurements is shown in FIG. 16 at inset (C). Dark/light edge colorings are consistent with the plus/minus sign on the state's real-valued adjacency matrix that arises from the graphical calculus for Gaussian pure states in the case of all modes initially being squeezed states.

In some implementations of the passive system configurations described above, a passive lattice can be determined for lattices of dimension $2^N$ (e.g., 2, 4, 8, 16). Additional details regarding passive implementations can be found, by way of example, in "Fault-Tolerant Quantum Computations with Static Linear Optics," by I. Tzitrin, et al., accessible at https://arxiv.org/abs/2104.03241, the entire content of which is incorporated herein by reference in its entirety for all purposes.

As discussed above, FIGS. 6A-6C describe how a Raussendorf lattice can be generated, in accordance with an embodiment. Each node represents the output of a single-mode source (emitting, at each time step, either a GKP plus state or a momentum squeezed state), and each link/edge represents the application of a CZ gate (e.g., implemented using a pair of squeezers sandwiched between two beamsplitters). The use of CZ gates in the generation procedure can, in some instances, however, be architecturally challenging, for example when an active squeezing element is implemented using measurement-based squeezing and feed-forward gates. As such, in some embodiments, all of the CZ gates represented by links/edges in FIGS. 6A-6C are replaced with 50:50 beam-splitters (which may be easier to implement experimentally, for example since measurement-based squeezing and feed-forward gates may require additional fast electronics on the photonics chip and may introduce unwanted noise in the light), and each node in FIG. 6B is modified as follows: the "B" and "C" nodes are modified to include four separate sources of squeezed light/GKP plus states, sent through four additional beamsplitters; and the "A" nodes are modified to include six separate sources of squeezed light/GKP plus states, sent through six additional beamsplitters. An example of such modifications is shown in FIG. 7, and an example of an entire associated passive system configuration chip layout is presented in FIG. 8.

Figure 7:
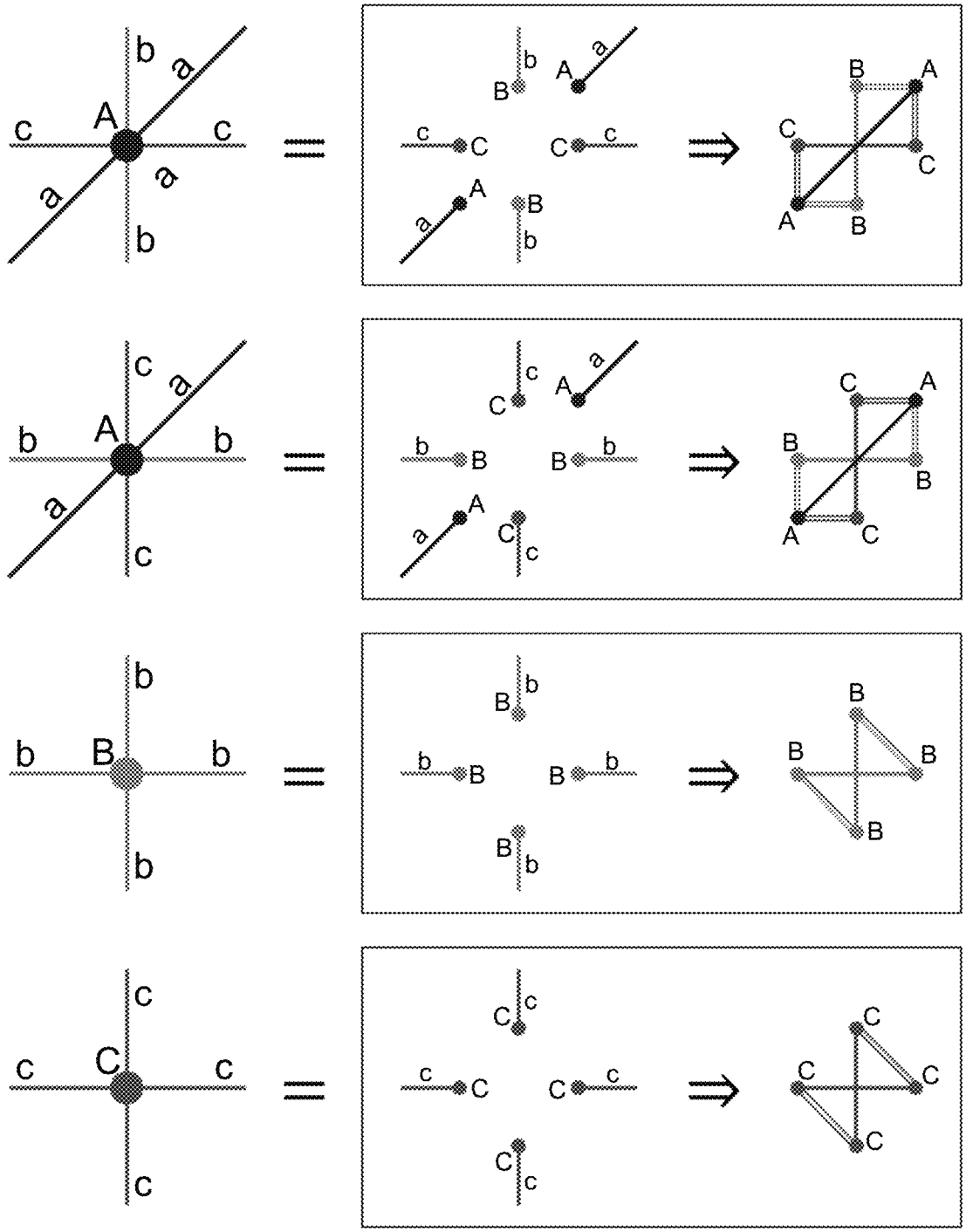
FIG. 7 shows node types for an implementation of a state generator using beamsplitters instead of CZ gates, according to an embodiment.

In FIG. 7, each link/edge represents a 50:50 beamsplitter (rather than a CZ gate). Four different types of node are depicted in FIG. 7, each configured to emit either four modes or six modes. The representations are the same in FIG. 7 as in FIG. 6B—the "A" nodes (and the "a" links/edges) are implemented at each layer of the state generator, the "B"

nodes and the "b" links/edges are implemented at odd layers of the state generator, and the "C" nodes and the "c" links/edges are implemented at even layers of the state generator. The arrow in each panel of FIG. 7 indicates that the rightmost beamsplitter interactions are implemented subsequently. The doubled lines in the rightmost diagrams of FIG. 7 indicate beamsplitters that cannot be implemented simultaneously with those indicated by the solid lines, though the order of solid/doubled line beamsplitters can be interchanged in the rightmost diagrams. In other words, any particular macronode (i.e., a collection of four "B" and/or "C" modes in FIG. 7) is populated only by four states. Although the state generated involves more modes and has a more complicated entanglement structure, it can be reduced to a Raussendorf-Harrington-Goyal ("RHG") lattice based on local homodyne measurements.

Figure 8:
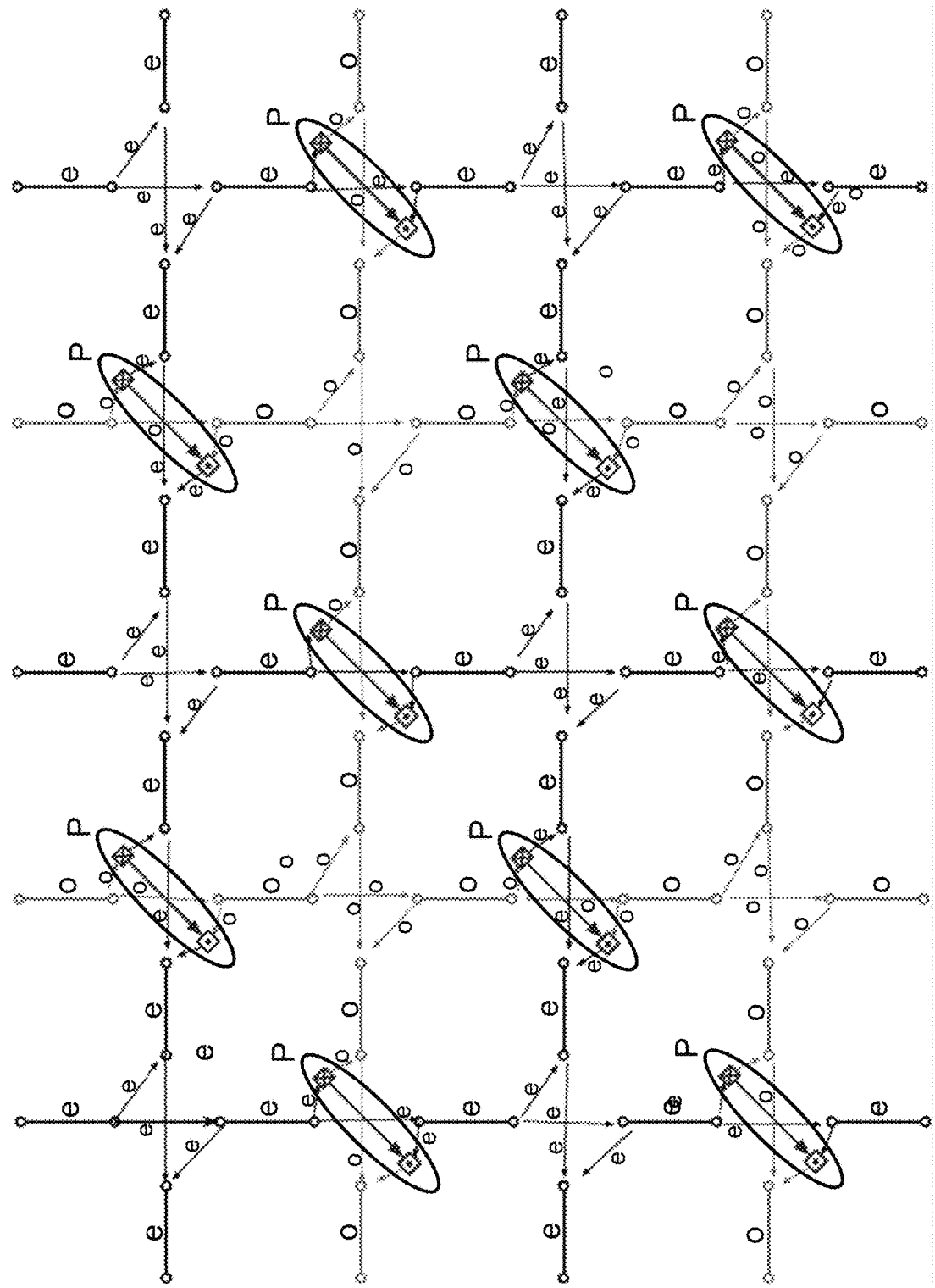
FIG. 8 is a schematic of a passive system configuration chip layout for generating states, including nodes as shown in FIG. 7, according to an embodiment.
Figure 10B:
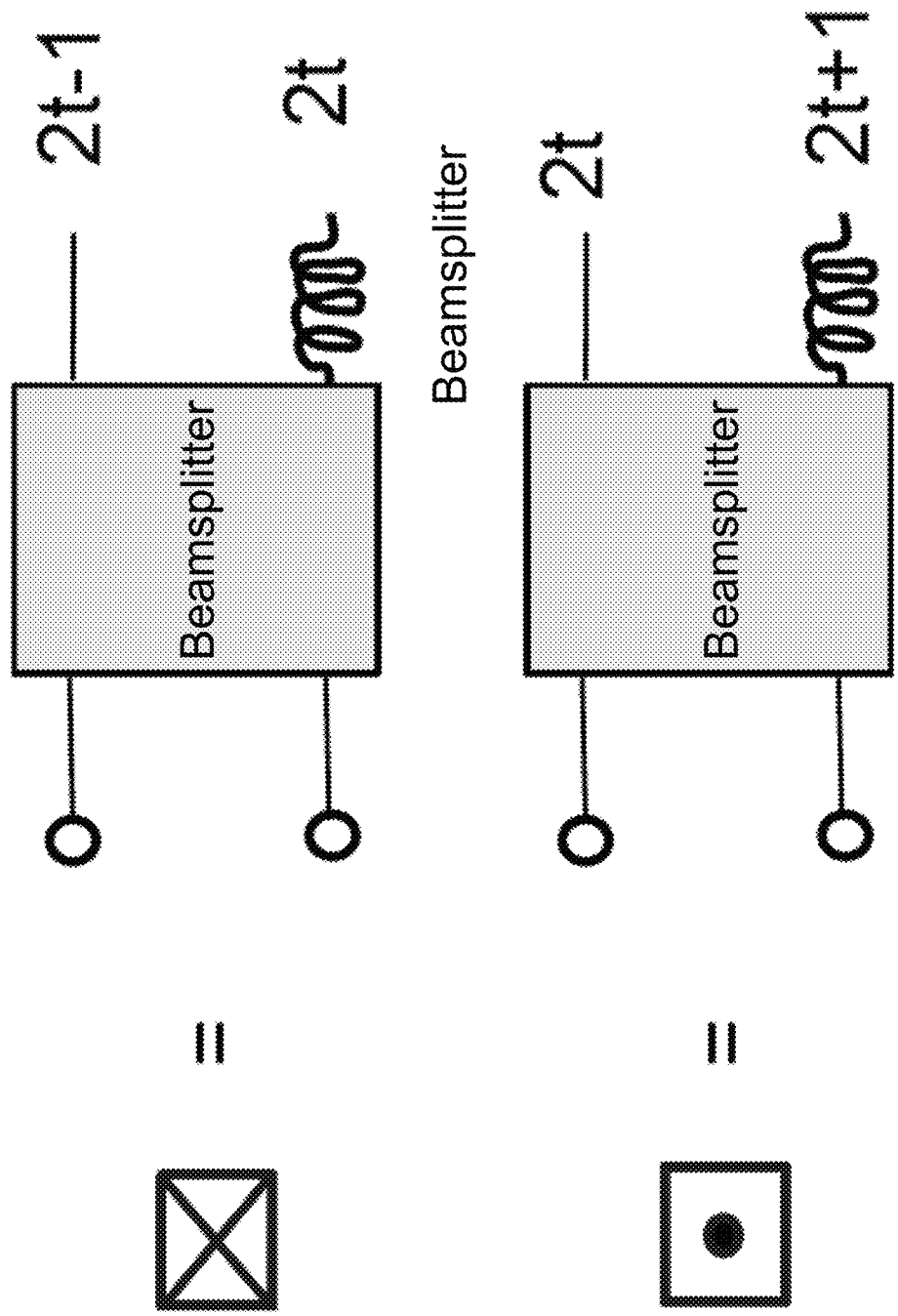

As noted above, FIG. 8 is a schematic of a passive system configuration chip layout for generating states, including nodes as shown in FIG. 6, according to an embodiment. In FIG. 8, one mode in each of mode pairs "P" is delayed in time by Δt, to connect the layers in different time steps (as also depicted in FIG. 10B). Within each mode pair of FIG. 8, the ⟩ corresponds to a link/edge to the previous layer and the ⟩ corresponds to a link/edge to the next layer. The links/edges labelled "e" denote links/edges occurring simultaneously at a single time step, for each even time step, and the links/edges labelled "o" denote an odd time step (note that the choice of even or odd is arbitrary and has been selected here to illustrate the staggering by a unit time step). At any given time step, all the arrows corresponding to a particular time step (whether odd or even) are implemented along with the links/edges joining the mode pairs P. The links/edges joining the mode pairs P are implemented in all time steps, with the arrow pointing from the ⟩ to the ⟩ mode. In FIG. 8, there are four types of two-mode entangled states each connected by a beamsplitter link/edge (discussed further below with reference to FIG. 11): (1) entangled states labelled "e" (dumbbell shape) being implemented at an even time step, (2) entangled states labelled "o" (dumbbell shape) being implemented at an odd time step, (3) a ⟩ that corresponds to an entangled state with the other mode going into the previous time step, and (4) a ⟩ entangled state with the second mode going to the next time step. Note that each of the entangled states corresponding to a ⟩ or a ⟩ fires once for each two consecutive time steps, and these firings are staggered with respect to each other, as explained in FIG. 10B. At any time step, each macronode (or junction) is populated by exactly four states. By applying suitable homodyne measurements on each macronode, the entire construction can be reduced to that of a Raussendorf lattice mentioned earlier.

A legend for the components of the circuit of FIG. 8 is shown and described with reference to FIGS. 10A-10B. FIG. 10A depicts the dumbbell-shaped entangled states of FIG. 8, each of which includes two modes that interact at a beamsplitter. Depending on the choice of the two modes used (small circles terminating each dumbbell-shaped entangled state), a variety of different entangled states can be implemented, examples of which are listed in FIG. 11. FIG. 10B is a legend for the ⟩ and ⟩ entangled states. The ⟩ corresponds to an entangled state similar to those of FIG. 10A, but with a difference in that there is a time delay. For example, if a second mode is measured at time step 't', a first mode would have been measured at time step 't−1', as represented by the cross symbol. If, however, the first mode is measured at time T, then the delayed mode would be measured at time step 't+1'. The ⟩ also corresponds to an entangled state with a time delay, but where a first mode is measured at time step T and a second mode is measured at time step 't+1'. The interleaving of these time delayed nodes, with the alternating odd and even entangled states, results in the operations shown in FIG. 8. The beamsplitters of FIGS. 10A and 10B can include extra phase shifters, as may be desired for a given application.

Figure 11A:
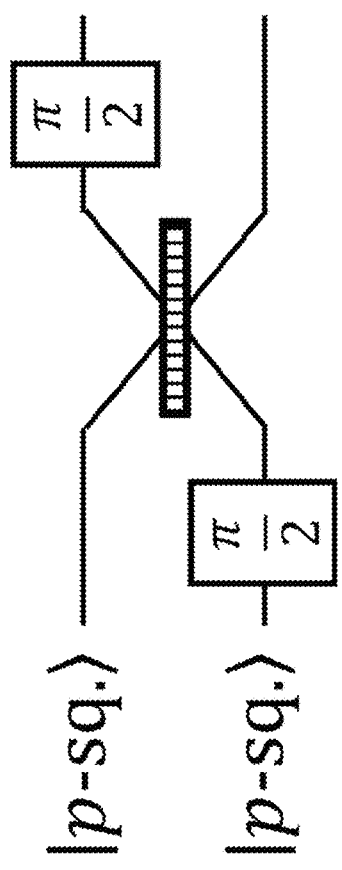
FIGS. 11A-11C show equivalent circuits for different types of entangled states depicted in FIG. 8, according to an embodiment.
Figure 11B:
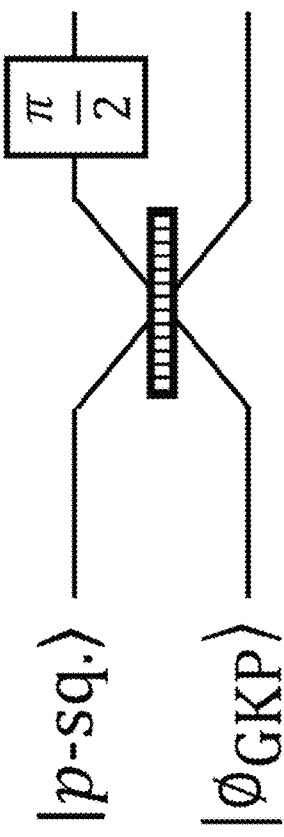
Figure 11C:
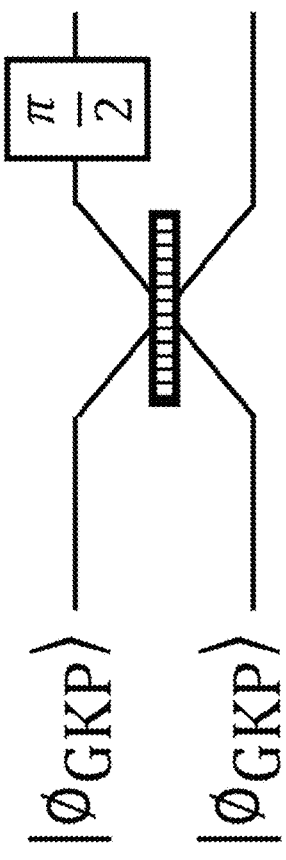

Each of the entangled states depicted in FIG. 8 can be of one of at least three types: (a) both modes are suitable squeezed states; (b) one mode is a squeezed state and one mode is a selected GKP state, or (c) both modes are selected GKP states. FIGS. 11A-11C show equivalent circuits for each of these different types of entangled states, respectively, in accordance with an embodiment.

Passive Architecture Generalization—Passive Construction of General Graph States In some embodiments, a general algorithm is defined for taking a collection of N Bell pairs and, by an interferometer followed by destructive measurements, combining one half of those N Bell pairs into a single vertex with N edges leading to the other halves of each pair. A single unit of the problem can be written as the graph transformation shown in FIG. 9, where the circle "C" indicates the modes that interact with the interferometer.

Some known beam splitter networks use four-splitters to construct cluster states. Such methods can be extended to 8 mode macronodes by repeating the procedure with another four modes and adding another series of beam splitters connecting mode 1 to mode 1, connecting mode 2 to mode 2, and so forth. This pattern can continue to scale to a generalized beam splitter network that can entangle together macronodes of size $2^N$. To accommodate different sized codes, additional ancilla states can be used to artificially increase the macronode size, after which those additional modes may be deleted via position measurements. Additional details pertaining to the construction of cluster states using four-splitters can be found, by way of example, in "Blueprint for a Scalable Photonic Fault-Tolerant Quantum Computer," by Bourassa, E. J., et al., *Quantum* (5), February 2021, and in "Fault-Tolerant Quantum Computation with Static Linear Optics," by Tzitrin, I., et al., accessible at https://arxiv.org/abs/2014.03241, the disclosures of each of which are incorporated herein by reference in their entireties.

In some embodiments, an algorithm implements a macronode construction from a base graph of any shape and any size. For example, in one implementation, the algorithm may be configured to implement a hypercubic state, while in another implementation, the algorithm may be configured to implement a non-hypercubic state.

Known interferometers that are based on the discrete Fourier transform ("DFT") can introduce complex-weighted edges in the graph between the outer modes of FIG. 9, such that the output graph state is no longer a true cluster state. Known universal N-mode multiport interferometer methods may not be desirable because they include a significant amount of redundancy. By minimizing the number of optical elements used in an optical network, loss and noise can be reduced within a network.

In some implementations, a minimum criteria for a unitary that performs the graph transformation shown in FIG. 9, encompassing the desired output and minimizing the necessary optical elements, is for entries of one row or one column to be equal to $1/\sqrt{N}$, where N is the number of interacting modes. The N×N unitary matrix can be written as:

$$\begin{bmatrix} \frac{1}{\sqrt{N}} & \cdots & \frac{1}{\sqrt{N}} \\ \vdots & \ddots & \vdots \\ c_{N1} & \cdots & c_{NN} \end{bmatrix}, \quad (11)$$

where other elements of the matrix can be any real constant.

A unitary matrix with the structure of that in Eq. (11) can be constructed with the beam splitter network:

$$U_{BN} = \prod_{i=1}^{N-1} \hat{F}_i^2 \hat{B}_{i,i+1}(\theta_i), \quad (12)$$

where $\hat{F}_i$ is the Fourier transform (a $\pi/2$ rotation in phase space), effected by a phase shifter, and:

$$\hat{B}_{j,k}(\theta_i) = e^{i\frac{\theta_i}{2}(\hat{q}_j \hat{p}_k - \hat{p}_k \hat{q}_j)} \quad (13)$$

$$\theta_i = \text{arcsec}(-\sqrt{N+1-i}) \quad (14)$$

The subscript denotes the mode on which the operator acts, and the product obeys the ordering of the operators from left to right (i=1 to i=N−1). This network uses only N−1 beam splitters.

In some implementations of the configurations described in this section, a passive lattice can be determined for lattices of dimension 6, 10, 12, 14, 18, etc.

Quantum Error Correction

In the following, examples of applying error correction procedures to computation in the presence of errors are presented, in accordance with some embodiments. In a first example, finite squeezing errors are addressed, and probabilistic code state generation is accounted for. In Method 1, below, steps for performing fault-tolerant computation are presented, in accordance with some embodiments. Method 1 takes, as an input, a particular computational task to be executed on a quantum computer and specified by a user. A subroutine of the computational task includes the implementation of rounds of quantum error correction that are interleaved with implementations of logical operations. The quantum error correction procedure is further detailed in Method 2. The quantum error correction procedure takes, as inputs, the measurement outcomes that have been realized to perform the logical operations, and outputs reliable syndrome data. As used herein, "syndrome data" refers to outcomes of measurements performed to determine whether an error has occurred, and if so, which site had the error. "Reliable" refers to outcomes obtained by performing such a measurement multiple times and polling over the outcomes to reduce the sensitivity of the outcomes to imperfections in the measurements. The error correction procedure includes the use of a decoder to process the measurement data. An example of a dual decoder, including an inner (bosonic) decoder and an outer (qubit) decoder, is explained in Methods 3 and 4 below.

Method 1: Procedure for Performing Fault-Tolerant Quantum Computation

Input: Computational task and inputs to the problem.
1. Compile. Based on the computational task and inputs to the problem, determine a suitable logical circuit including layers of operations, and select appropriate quantum error-correction code(s) and decoder(s).
2. State Initialization. Generate a cluster state based on the selected quantum error-correction code(s) and the logical circuit. An example of a generated state can include GKP qubits on a known subset of the modes and squeezed vacuum states on the remaining modes.
3. Implement Logical Circuit. Iteratively apply layers of logical operations/measurements using the logical circuits, and perform error correction:
    (a) Perform one layer of logical operations by measuring a subset of sites within an appropriate (e.g., predetermined) basis, as appropriate for the quantum computation, the selected quantum error-correction code(s) and measurement outcomes from a previous round of error correction and logical operations. The measurements can include, for example, homodyne measurements on optical modes.
    (b) Perform error correction using Method 2 on the measurement outcomes obtained in the previous step.
4. Process Measurement Outcomes Process the logical measurement outcomes to obtain an output for the computational task.

Output: Output of the computational task for given inputs.

Method 2: Procedure for Performing Quantum Error Correction

Input: (1) Measurement outcomes from performing logical operations, e.g., real-valued homodyne measurement outcomes, and (2) Information about which sites comprise GKP qubits and squeezed vacuum.
1. Run Decoder. An example decoder implements a two-step procedure, as follows:
    (a) Inner Decoder: Process the real-valued homodyne measurement outcomes to obtain binary outcomes representing bit values using local and global information obtained via Method 3. Uses information regarding which sites comprise which states.
    (b) Outer Decoder and Error Correction: Apply outer code error correction using Method 4 with additional information supplied by the previous steps.

Output: Reliable syndrome outcomes.

Method 3 Example Inner Decoder

Input: Vector $p = (p_0, \ldots, p_N)$ of homodyne measurement outcomes, with $p_i \in $ , and the noise model.
1. Identify directions that are noisy and directions that are not noisy.
2. Perform suitable change of basis
3. Apply binning along the new directions to round results to nearest ideal peak position, while taking into account the self-consistency of the results (e.g. parity).
4. Undo the change of basis to return a candidate lattice point $\vec{n}\sqrt{\pi}$.
5. Obtain a binary string by taking $\vec{n}$ mod 2.

Output: Interpreted qubit measurement outcome.

Method 4 Example Outer Decoder: Minimum-Weight Perfect Matching ("MWPM")

Input: Qubit measurement outcome(s) from Method 3
1. Syndrome Identification: Construct relevant stabilizer measurement outcomes from the input qubit measurement outcomes
2. Matching Graph Construction: Construct a complete graph using:
    Vertices, including pairs of unsatisfied syndromes (with additional vertices, if desired for specific boundary conditions). "Unsatisfied" syndromes refer to those measurements where errors were detected.

Edges, which connect every pair of vertices.

Weights, which are assigned to the edges and which reflect the probability of the most likely error that gave rise to the pairs of unsatisfied syndromes.

3. Matching Method: Find a minimum-weight perfect matching by running, e.g., Edmonds' algorithm on the matching graph from the previous step.
4. Recovery Operation: Infer one or more recovery operations from the matching graph.
5. Correction: Interpret syndrome outcomes given the recovery operation(s).

Output: Reliable syndrome outcomes.

Example Analysis

Noise Model

In some embodiments, a generated cluster state is populated by two types of states discussed earlier herein: the GKP encoded $|+\rangle$ state and the momentum-squeezed state. The position wavefunction of the ideal GKP state is:

$$|+\rangle_{gkp} = \Sigma_{n=-\infty}^{\infty} |n\sqrt{\pi}\rangle_q. \qquad (15)$$

where $|\cdot\rangle_q$ corresponds to a position eigenstate. To model a state initialization error, a Gaussian white noise channel can be given by:

$$\mathcal{N}_Y(\hat{\rho}) = \int \frac{d^2\xi}{\pi\sqrt{Y}} \exp\left[-\frac{1}{2}\xi^T Y^{-1}\xi\right] D(\xi)\hat{\rho} D(\xi)^\dagger, \qquad (16)$$

where Y is the noise matrix, and the Weyl-Heisenberg displacement operator is defined as $D(\xi)=\exp[i\xi^T\Omega\hat{r}]$, where $\xi=(\xi_q,\xi_p)^T \in {}^2$ for a single mode, $\Omega$ is the anti-symmetric symplectic metric, and $\hat{r}=(\hat{q},\hat{p})^T$. For the GKP states and the momentum states, the corresponding noise matrices are given by:

$$Y_{gkp} = \begin{pmatrix} \delta & 0 \\ 0 & \delta \end{pmatrix}, Y_p = \begin{pmatrix} \delta^{-1} & 0 \\ 0 & \delta \end{pmatrix}. \qquad (17)$$

Alternatively, to model the state initialization error, and given ideal $GKP|+\rangle_{gkp}$ states, the noise channels $N_{Y_{gkp}}$ or $N_{Y_p}$, with probabilities $1-p_0$ and $p_0$, respectively, can be applied to the ideal $GKP|+\rangle_{gkp}$ states. This latter method approximates the realistic momentum state well in the position basis but has a periodic structure in momentum space (revisited below).

There are several reasons to model the state preparation error with the Gaussian white noise channel of Equations (16) and (17). For example, many CV gates use a measurement-based squeezing operation that naturally leads to imperfections modeled as a Gaussian white noise channel. Furthermore, this type of noise is closely related to pure loss and following a pure loss channel by an amplifier of the inverse strength leads to a Gaussian white noise channel. In settings where loss can be treated this way, such as in measurement imperfections, this relationship can play an important role.

The Gaussian white noise channel is readily described using the Heisenberg picture. Consider the quadrature operators of the N-modes, where $\hat{R}=(\hat{q}_1, \hat{p}_1, \hat{q}_2, \hat{p}_2, \ldots, \hat{q}_N, \hat{p}_N)^T$. The noise channel on each mode can be described as:

$$\hat{R} \to \hat{R}+\rangle, \qquad (18)$$

where $\rangle = (\xi_{q1}, \xi_{q2}, \ldots, \xi_{qN}, \xi_{p1}, \xi_{p2}, \ldots, \xi_{pN})^T$ are random variables all drawn from the corresponding normal distributions associated with the state initialization errors. It is assumed that the initial means are all set to zero, i.e., $\rangle \hat{R}\rangle = 0$. This picture is useful because often only displacement errors are simulated, rather than the actual wavefunction. As such, tracking the displacement errors can provide a direct and efficient way to simulate the system.

Cluster State Initialization

As discussed in the previous subsection, a vector of length 2N can first be initialized (where N is the number of modes), to store the means of the q and p quadratures for each mode. Initially, the mean of every quadrature is 0. For each mode, with probability $p_0$, a momentum-squeezed state is prepared, and with probability $(1-p_0)$, a $GKP|+\rangle$ state is prepared. Next, CZ gates (e.g., "perfect" or "ideal" CZ gates) are applied according to the structure of the cluster state, i.e., wherever there is an edge between two nodes in the lattice. Some of the CZ gates may be inverted to match the CV toric code convention.

Recall that the symplectic transformation for a CZ gate in the $(q_1, q_2, p_1, p_2)$ basis ordering is given by:

$$S_{CZ} = \begin{pmatrix} 1 & 0 & 0 & 0 \\ 0 & 1 & 0 & 0 \\ 0 & 1 & 1 & 0 \\ 1 & 0 & 0 & 1 \end{pmatrix} \equiv \begin{pmatrix} 1 & 0 \\ A_2 & 1 \end{pmatrix}, \qquad (19)$$

Notice that $A_2$ is the adjacency matrix for the two modes. In other words, $A_2$ is a symmetric binary matrix whose $ij^{th}$ entry is 1 if the two modes are connected by an edge, and 0 otherwise. For the application of $CZ^\dagger$, it is presumed that $A_2 \to -A_2$. (Note: The notation $\dagger$, for a given gate, refers to its Hermitan conjugate.) Therefore, the symplectic matrix corresponding to the connection of all the optical modes into a cluster state is given by:

$$S = \begin{pmatrix} 1 & 0 \\ A & 1 \end{pmatrix}, \qquad (20)$$

where now A is the N×N adjacency matrix of the corresponding graph, except with $-1$s where the $CZ^\dagger$ is applied. The initial noise matrix for all the modes is:

$$\Sigma_0 = \begin{pmatrix} \Sigma_x & 0 \\ 0 & \delta\mathbb{1} \end{pmatrix}. \qquad (21)$$

where $\Sigma_x$ is a diagonal matrix with elements $\delta^{-1}$ or $\delta$ depending on if the mode is a p-squeezed or GKP state, respectively. Thus, the full noise matrix evolves to:

$$\Sigma_0 \to S\Sigma_0 S^T = \begin{pmatrix} \Sigma_x & \Sigma_x A^T \\ A\Sigma_x & \delta\mathbb{1} + A\Sigma_x A^T \end{pmatrix}, \qquad (22)$$

Finally, the momentum values are measured. In this case, only the momentum part of the noise matrix is considered, which is given by:

$$\Sigma_{p'} = \delta \mathbb{1} + A\Sigma_x A^T. \qquad (23)$$

Inner Decoder

In some embodiments, a standard map from homodyne measurement outcomes to bit values is a binning function derived from the translational symmetry of the original GKP state, i.e., the perfect periodicity in the q and p directions. The subscript 'gkp' is dropped when the context is clear. The $|+\rangle$ and $|-\rangle$ states are each $2\sqrt{\pi}$-periodic in momentum but shifted relative to each other by $\sqrt{\pi}$. As such, the homodyne outcomes can be placed into bins of width $\sqrt{\pi}$, associating with $|+\rangle$ the outcomes falling in even bins and with $|-\rangle$ for all the other values. While this binning procedure uses the original symmetry of the GKP states, it does not account for the correlations in the noise matrix introduced by the CZ gates and the presence of p-squeezed states. Although some of this information can be incorporated into the RHG decoder, it can be valuable to identify an improved CV decoder or translator that acknowledges the noise matrix in Equation (9). Note that the translator $\mathcal{T}$ is a function that takes CV data and outputs binary data as though the CV modes are qubits, i.e., $$\mathcal{T} : \mathbb{R}^n \to \{-1,1\}^n. \qquad (24)$$

To illustrate the importance of such a translator, consider the example of a momentum-squeezed state at the center of a primal face, surrounded by four GKP states. A large amount of CV noise, of magnitude $\delta^{-1}$, is symmetrically distributed from the q quadrature of the momentum state to the p quadratures of the connected GKP states. Due to the periodicity of the GKP states, however, the net effect is either the identity gate or Z gates applied to all of the surrounding GKP states, which commutes with the stabilizers in the RHG lattice.

A translator is desired for the hybrid system configuration which takes into account the encoding phase of the computation, since this will be the same regardless of the ensuing logical operations of the computation. In other words, it is known which modes are GKP and p-squeezed states, and it is known where CZ gates have been applied to form the cluster state. As the numerical example will show, if the distribution of p-homodyne outcomes were to be examined at this stage, the p-homodyne outcomes would be sampled from a periodic arrangement of Gaussian distributions, each with covariance $\Sigma_p$, and each Gaussian centered at a point $n\sqrt{\pi}$, where n are integer valued vectors from a set that corresponds to the ideal state of the qubits.

Suppose the values p are obtained after the homodyne measurements. From the argument above, it is assumed that the candidate distributions that could have produced p are Gaussian distribution functions with covariance $\Sigma_p$ and centered at lattice points $n\sqrt{\pi}$. The responsibility of a given lattice point for the result p is given by:

$$r = \exp[-(n\sqrt{\pi}-p)^T \Sigma_p^{-1}(n\sqrt{\pi}-p)]. \qquad (25)$$

Thus, the lattice point which was most likely to have produced the point p is given by:

$$n_{IQP} = \arg\min_{n \in \mathbb{Z}^N} (n\sqrt{\pi} - p)^T \Sigma_p (n\sqrt{\pi} - p), \qquad (26)$$

where the subscript IQP is selected to indicate that this is an integer quadratic program, i.e., a minimization of a quadratic function over an integer domain. For simplicity, a standard approximation is used that all peaks in the GKP state have equal weight. One could also include an envelope that weights peaks differently, in which case this information could also be included in the calculation of the responsibility. In general, IQPs are NP-hard, so the heuristic strategy should be computationally tractable. A summary of such a strategy is presented in Method 3, and a full example for a single swap-out is presented in Method 5.

Outer Decoder

After obtaining and binning the outcomes of the homodyne measurement, error correction can be performed for the qubit outer code. The details of the error correction problem are summarized in Method 4 for a particular (e.g., common) choice of decoding algorithm: minimum-weight perfect matching (MWPM). Note, however, that a myriad of other decoders can be used.

In the weight assignment step, analog CV information (full homodyne measurement outcomes) can be included, along with the positions of the p-squeezed states in the lattice.

Numerical Example

Heuristic translators of the present disclosure can identify directions in p-space that have significantly more noise than others due to the replacement of some GKP states with p-squeezed states, followed by the application of CZ gates for encoding into the cluster state corresponding to the code of choice. In the space orthogonal to these noisy directions, there is a small amount of noise. One can perform a change-of-basis to determine the CV data along these directions with different levels of noise. These directions represent linear combinations of the original modes which, in the ideal case, would still yield integer valued outcomes. With appropriate binning, taking into account self-consistency of the integer linear combinations, one can determine outcomes in this basis. Undoing the change of basis results in a reversion to an integer valued vector for the code lattice which, after taking mod 2, returns a bit string representing the qubit-level outcomes.

An example of how the heuristic translator operates for the case of a p-squeezed state surrounded by four GKP states is presented below, in accordance with some embodiments, and includes assigning a bit string to the five homodyne outcomes:

Method 5: Example Inner Decoder for One p-Squeezed State Surrounded by GKP States.

Input: Vector $p = (p_0, \ldots, p_4)$ of homodyne measurement outcomes, with $p_i \in \mathbb{R}$.

1. Apply the following change-of-basis $Tp = p'$ where:

$$T = \begin{pmatrix} 1 & 0 & 0 & 0 & 0 \\ 0 & 1 & 1 & 1 & 1 \\ 0 & 1 & 1 & -1 & -1 \\ 0 & 1 & -1 & 1 & -1 \\ 0 & 1 & -1 & -1 & 1 \end{pmatrix} \qquad (27)$$

2. Bin the first component of p' to the nearest integer multiple of $\sqrt{\pi}$ to return $n'_0 \sqrt{\pi}$.
3. Of the last three components of p', find the component i that is closest to an integer multiple $n'_i$ of $\sqrt{\pi}$. Round $p'_i$ to $n'_i \sqrt{\pi}$.
4. If $n'_i$ is even (odd), round the remaining three components other than $p'_0$ and $p'_i$ to the nearest even (odd)

integer multiples of $\sqrt{\pi}$ for each component. This yields $\sqrt{\pi}n'=\sqrt{\pi}(n'_0, n'_1, n'_2, n'_3, n'_4)$.

5. Undo the change of basis on the integer-valued vector $T^{-1}n'=v$.
6. The last four components of v are either integer-valued or half-integer valued. If they are half-integer valued, add ½ to each component. This yields a five-component integer-valued vector n.
7. Take n mod 2=s to be the five-component binary string output.

Output: String of five bit values s.

FIG. 17 illustrates the modularity of the system configuration of GBS generating chips, in accordance with some embodiments. In some implementations, the GBS generating chip is reconfigurable. In other implementations, the GBS generating chip is reconfigurable, but includes integrated PNRs to bring losses down. GBS generating chips of the present disclosure may be partially or completely stored within, and/or operate in, a cryogenic environment. For example, in some embodiments, state generation is performed within a cryostat, while subsequent computations are performed at room temperature. Each GBS generating chip includes an active switching system with fast switches that may not be arbitrarily reconfigurable. Depending on the application, some delay between the generation phase and the switching phase can be beneficial.

Technological Advantages

Modularity

The various aspects of computation described herein—state preparation, multiplexing, cluster-generation, and measurement—have different associated hardware specifications. These hardware specifications facilitate a modular design in which different tasks may be performed on different chips. For example, the generation of bosonic encoded states can be performed using non-reconfigurable circuits with on-chip PNRs. Cluster stitching can also be performed on a non-reconfigurable chip. The measurements on the generated cluster can be performed using reconfigurable homodyne detection fed-forward from measurements on other homodyne detectors.

Minimal Cryogenic Requirements

State generation chips described herein can include low-loss non-reconfigurable circuits in static integrated platforms, such that on-chip PNRs may be used, with the entireties of the chips optionally being placed in a cryostat and the remaining portions of the system (e.g., the switching network for the state generation) can be operated at room temperature.

Keeping the switching network at room temperature can serve to exploit any delays introduced when extracting the light out of the cryostat. The cluster manipulation can be performed using reconfigurable homodyne detection and delay lines to enable feed-forward. The generation and manipulation of the cluster can thus be performed on chips. On-chip homodyne detection may be faster than detection using superconducting detectors, and as such the losses associated with the delay lines present at the cluster-manipulation stage may be reduced.

Homodyne Detection Sets Timescales

In some embodiments, the timescales for cluster generation and cluster manipulation are set by the timescales of homodyne detection (or by any other slower process that may be present during the final generation procedure). This can be advantageous because homodyne detection can be much faster than PNR detection during the multiplexing procedure, and/or than threshold detectors during dual-rail encoding. Faster time scales can mean that the cluster-generation delay lines are shorter and thus incur lower losses. These advantages can be observed in FIGS. 2A, 2C and 4C, for example in the fact that the delay lines labelled τ in FIGS. 2A and 2C are shorter in system designs set forth herein, as compared with known photonic systems.

Figure 18:
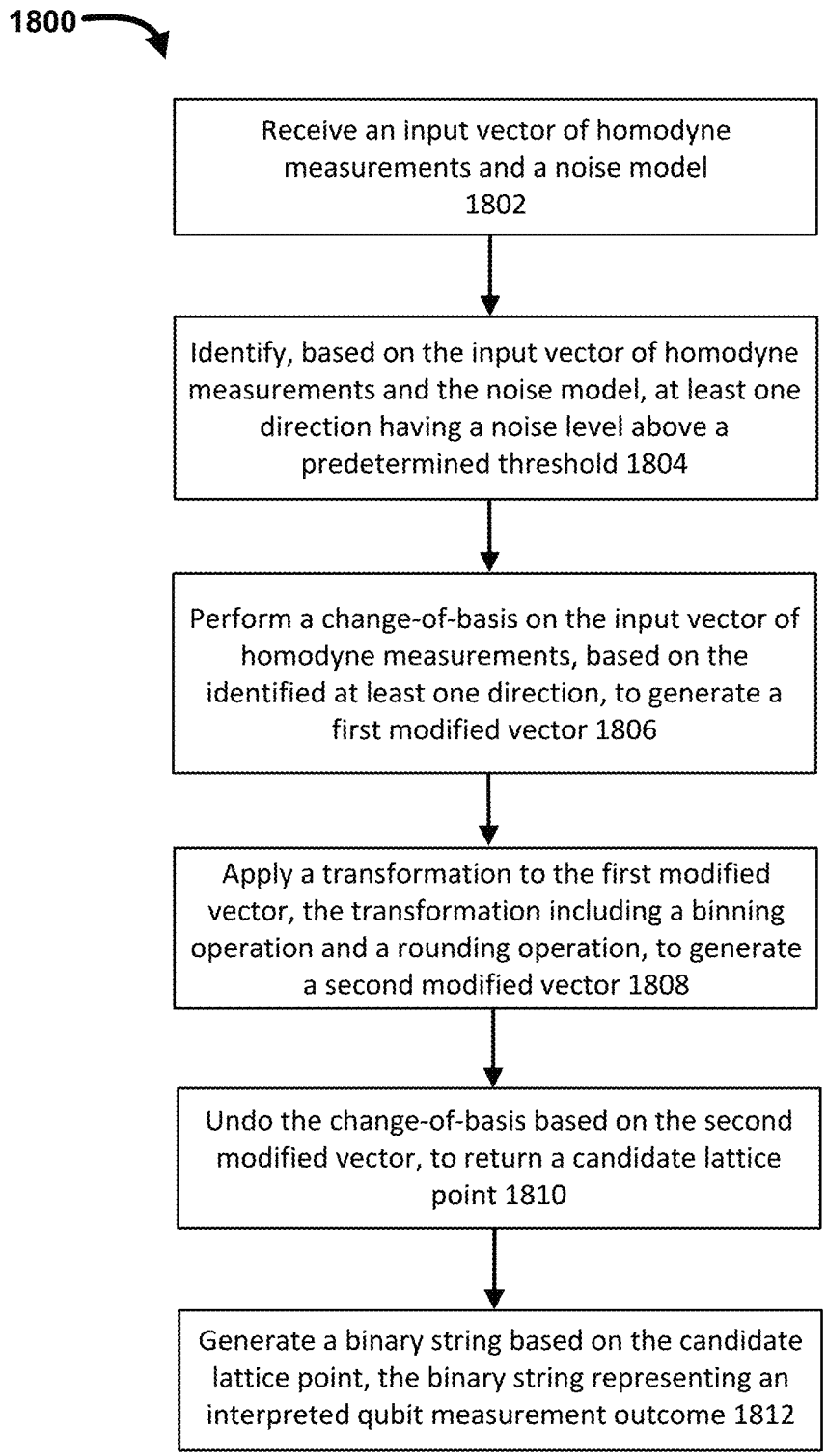
FIG. 18 is a flow diagram showing a first method for generating a hybrid cluster state, in accordance with some embodiments.

FIG. 18 is a flow diagram showing a first method for generating a hybrid cluster state, in accordance with some embodiments. As shown in FIG. 18, the method 1800 includes receiving an input vector of homodyne measurements and a noise model at 1802. At 1804, at least one direction having a noise level above a predetermined threshold is identified based on the input vector of homodyne measurements and the noise model. At 1806, a change-of-basis is performed on the input vector of homodyne measurements (e.g., using a transformation matrix), based on the identified at least one direction, to generate a first modified vector, and a transformation is applied at 1808 to the first modified vector, to generate a second modified vector. The binning operation can be based, for example, on a map from homodyne measurement outcomes to bit values. Alternatively or in addition, the rounding operation can include rounding to an integer multiple of $\sqrt{\pi}$. The transformation can include a binning operation and a rounding operation. The method 1800 also includes undoing the change-of-basis at 1810, based on the second modified vector, to return a candidate lattice point. At 1812, a binary string is generated based on the candidate lattice point, the binary string represents an interpreted qubit measurement outcome.

Figure 19:
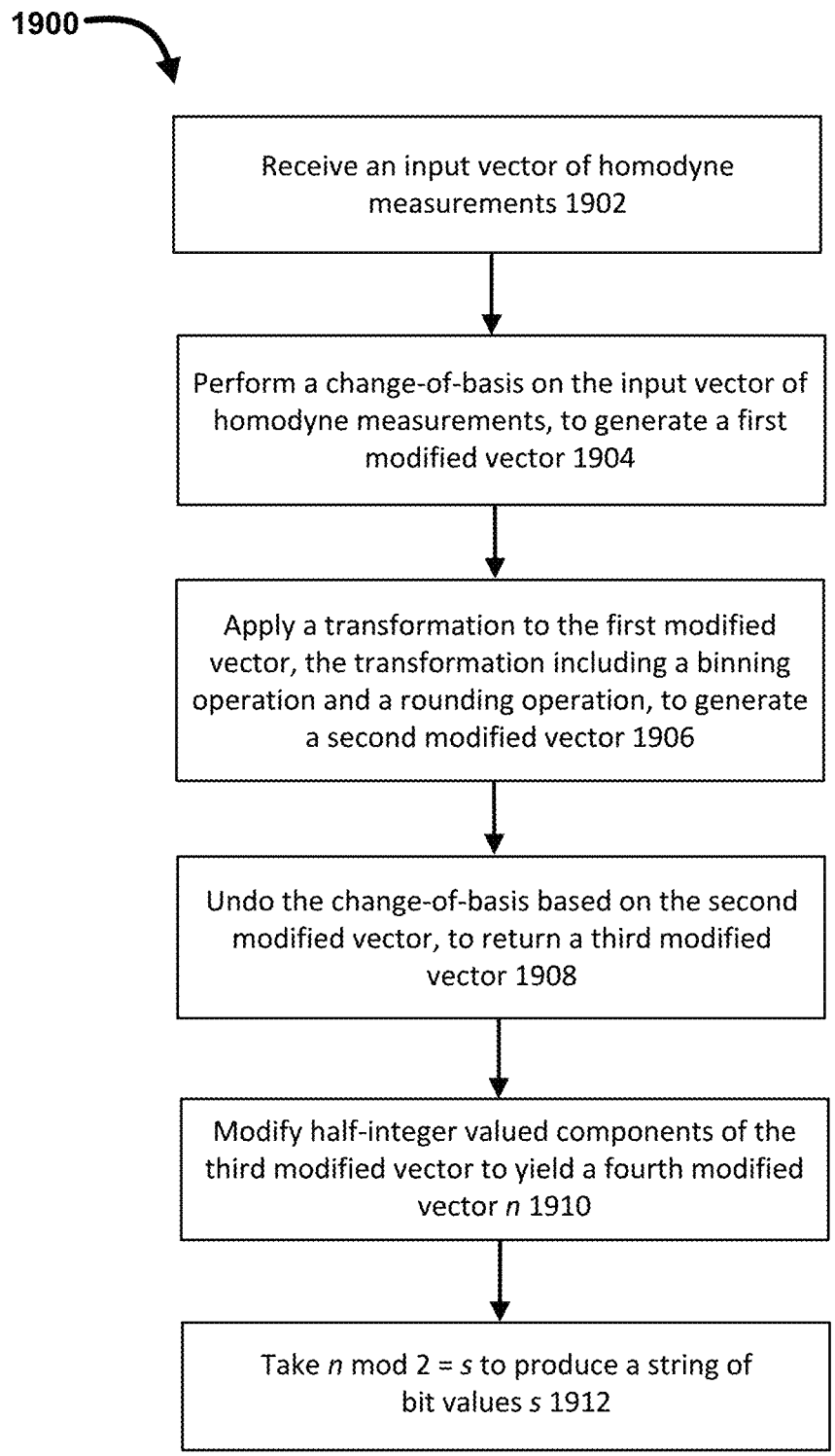
FIG. 19 is a flow diagram showing a second method for generating a hybrid cluster state, in accordance with some embodiments.

FIG. 19 is a flow diagram showing a second method for generating a hybrid cluster state, in accordance with some embodiments. As shown in FIG. 19, the method 1900 includes receiving an input vector of homodyne measurements at 1902, and performing a change-of-basis on the input vector of homodyne measurements, at 1904, to generate a first modified vector. At 1906, a transformation is applied to the first modified vector, to generate a second modified vector. The transformation can include a binning operation and a rounding operation. The binning operation can be based, for example, on a map from homodyne measurement outcomes to bit values. Alternatively or in addition, the rounding operation can include rounding to an integer multiple of $\sqrt{\pi}$. At 1908, the change-of-basis is undone, based on the second modified vector, to return a third modified vector. Half-integer valued components of the third modified vector are modified at 1910m to yield a fourth modified vector n, and a string of bit values s is produced by taking n mod 2=s.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
    an integrated circuit including:
        a plurality of sources including qubit sources and cluster sources; and
        a plurality of controlled-Z gates, each controlled-Z gate from the plurality of controlled-Z gates connecting at least two sources from the plurality of sources,
    the integrated circuit configured, during operation, to sequentially energize subsets of sources from the plurality of sources and to generate a Raussendorf lattice based on interactions between sources from the plurality of sources.

2. The apparatus of claim 1, wherein each controlled-Z gate from the plurality of controlled-Z gates is a two-qubit gate.

3. The apparatus of claim 1, wherein the cluster sources are 1D cluster sources.

4. The apparatus of claim 1, wherein, during operation of the integrated circuit, qubits emitted from the qubit sources become entangled with qubits emitted from at least one spatial neighbor of the qubit sources.

5. A system, comprising:
    a plurality of optical circuits configured to generate light having a plurality of output states via Gaussian Boson sampling (GBS);
    a plurality of photon number resolving detectors (PNRs) operatively coupled to the plurality of optical circuits, the plurality of PNRs configured to generate qubit clusters based on the plurality of output states;
    a multiplexer operatively coupled to the plurality of PNRs, the multiplexer configured to perform multiplexing of the qubit clusters and to replace empty modes with squeezed vacuum states, thereby configured to generate light having a plurality of hybrid resource states; and
    an integrated circuit operatively coupled to the multiplexer, the integrated circuit configured to entangle hybrid resource states from the plurality of hybrid resource states into a higher-dimensional cluster state that includes states for fault-tolerant quantum computation.

6. The system of claim 5, wherein the integrated circuit is configured to entangle the hybrid resource states from the plurality of hybrid resource states into the higher-dimensional cluster state without the use of reconfigurable linear optics.

7. The system of claim 5, wherein the higher-dimensional cluster state includes a three-dimensional macronodal lattice structure in one temporal dimension and two spatial dimensions.

8. The system of claim 5, wherein the higher-dimensional cluster state includes a three-dimensional lattice structure, and each site from a plurality of sites of the lattice structure includes at least four modes.

9. An apparatus, comprising:
an integrated circuit including:
a plurality of multi-mode sources; and
a plurality of beamsplitters operatively coupled to the plurality of multi-mode sources, each beamsplitter from the plurality of beamsplitters connecting at least two multi-mode sources from the plurality of multi-mode sources,
the integrated circuit configured, during operation, to sequentially energize subsets of multi-mode sources from the plurality of multi-mode sources and to generate a Raussendorf lattice based on interactions between multi-mode sources from the plurality of multi-mode sources and at least one homodyne measurement.

10. The apparatus of claim 9, wherein the Raussendorf lattice includes a first layer including a set of qubits of a first type and a second layer including a set of qubits of a second type different from the first type.

11. The apparatus of claim 9, wherein, during operation of the integrated circuit, qubits emitted from the plurality of multi-mode sources become entangled with qubits emitted from at least one spatial neighbor of the plurality of multi-mode sources.

12. The apparatus of claim 11, wherein the qubits emitted from the plurality of multi-mode sources further become entangled with previously-emitted modes and subsequently-emitted modes.

13. A method, comprising:
receiving an input vector of homodyne measurements and a noise model;
identifying, based on the input vector of homodyne measurements and the noise model, at least one direction having a noise level above a predetermined threshold;
performing a change-of-basis on the input vector of homodyne measurements, based on the identified at least one direction, to generate a first modified vector;
applying a transformation to the first modified vector, the transformation including a binning operation and a rounding operation, to generate a second modified vector;
undoing the change-of-basis based on the second modified vector, to return a candidate lattice point; and
generating a binary string based on the candidate lattice point, the binary string representing an interpreted qubit measurement outcome.

14. The method of claim 13, wherein the binning operation is based on a map from homodyne measurement outcomes to bit values.

15. The method of claim 13, wherein the change-of-basis is performed using a transformation matrix.

16. The method of claim 13, wherein the rounding operation includes rounding to an integer multiple of $\sqrt{\pi}$.

* * * * *